United States Patent
Takahashi

(10) Patent No.: US 7,852,517 B2
(45) Date of Patent: Dec. 14, 2010

(54) CONTROL APPARATUS AND METHOD THEREOF, RECORDING APPARATUS AND METHOD OF CONTROLLING THE SAME

(75) Inventor: Seiji Takahashi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 913 days.

(21) Appl. No.: 10/255,023

(22) Filed: Sep. 26, 2002

(65) Prior Publication Data
US 2003/0063325 A1 Apr. 3, 2003

(30) Foreign Application Priority Data
Oct. 1, 2001 (JP) .............................. 2001-305696

(51) Int. Cl.
*H04N 1/36* (2006.01)
*H04N 1/04* (2006.01)
(52) U.S. Cl. ...................... 358/420; 358/488; 358/1.15; 358/1.13; 358/1.5; 358/412; 347/22; 347/128; 347/32; 347/35; 318/628
(58) Field of Classification Search .................. 358/1.5, 358/1.13, 1.14, 1.15, 420, 497, 488, 412; 399/208, 202, 205; 347/9, 33, 22, 128, 167, 347/168, 32, 35; 318/282, 628; 388/800
See application file for complete search history.

(56) References Cited

U.S. PATENT DOCUMENTS

| 5,007,751 | A | * | 4/1991 | Yamakawa | 400/322 |
|---|---|---|---|---|---|
| 5,288,157 | A | * | 2/1994 | Tanaka | 400/279 |
| 5,416,395 | A | * | 5/1995 | Hiramatsu et al. | 318/600 |
| 5,856,835 | A | * | 1/1999 | Umeda et al. | 347/23 |
| 5,861,726 | A | * | 1/1999 | Uchikata et al. | 318/685 |
| 5,889,536 | A | * | 3/1999 | Sasaki | 347/30 |
| 6,224,183 | B1 | * | 5/2001 | Kono et al. | 347/19 |
| 6,260,945 | B1 | * | 7/2001 | Niikura | 347/37 |
| 6,338,539 | B1 | * | 1/2002 | Kobayashi et al. | 347/23 |
| 6,390,698 | B1 | * | 5/2002 | Yoshida et al. | 400/356 |
| 6,402,294 | B2 | * | 6/2002 | Minowa | 347/37 |
| 6,564,028 | B2 | * | 5/2003 | Kanno | 399/205 |
| 6,600,286 | B2 | * | 7/2003 | Tanaka et al. | 318/560 |
| 6,747,429 | B2 | * | 6/2004 | Igarashi | 318/560 |
| 6,809,489 | B1 | * | 10/2004 | Yoshida et al. | 318/560 |
| 2001/0020962 | A1 | * | 9/2001 | Kanaya et al. | 347/24 |
| 2002/0036618 | A1 | | 3/2002 | Wakai et al. | 345/157 |

FOREIGN PATENT DOCUMENTS

| JP | 60236781 | A | * 11/1985 |
|---|---|---|---|
| JP | 1-259970 | | 10/1989 |
| JP | 2001-268955 | | 9/2001 |

OTHER PUBLICATIONS

Japanese Office Action dated Jan. 7, 2005 concerning basic Japanese Patent Application No. 2001-305696.

* cited by examiner

*Primary Examiner*—King Y Poon
*Assistant Examiner*—Quang N Vo
(74) *Attorney, Agent, or Firm*—Fitzpatrick, Cella, Harper & Scinto

(57) ABSTRACT

A position control unit performs control so that the position of a controlled object is detected, and as a result of the detection, a drive unit is reverse-directed if the controlled object is situated beyond an ultimate target position, and the operation of the drive unit is stopped if the controlled object is situated beyond an acceptable ultimate target range.

13 Claims, 22 Drawing Sheets

FIG. 21
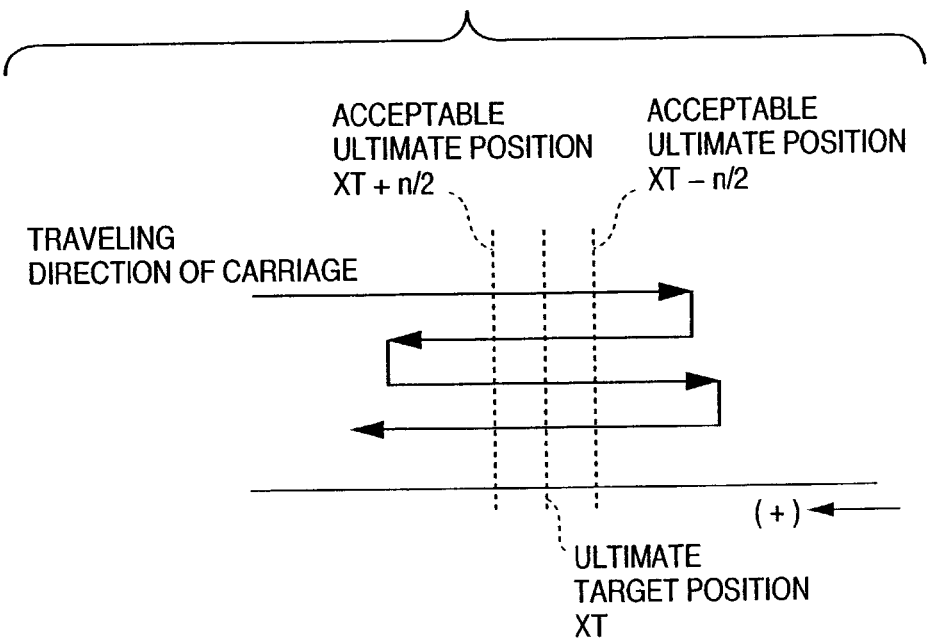
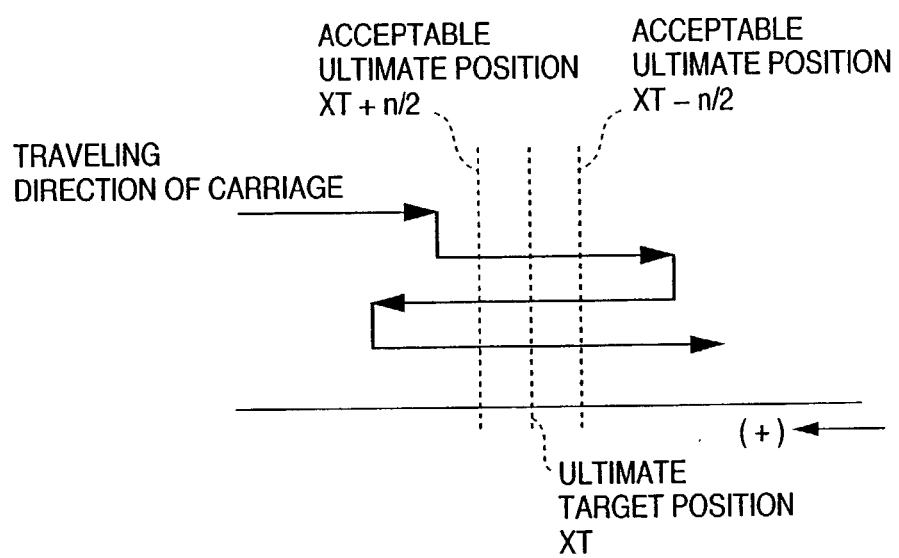

CONTROL APPARATUS AND METHOD THEREOF, RECORDING APPARATUS AND METHOD OF CONTROLLING THE SAME

FIELD OF THE INVENTION

The present invention relates to a control apparatus performing control to move a controlled object to a position within an acceptable ultimate target range including positions ahead and behind an ultimate target position, and a method thereof, and a recording apparatus and a method of controlling the same.

BACKGROUND OF THE INVENTION

Traditionally, in the method of controlling drive mechanisms such as a motor, so called "feedback control" in which the speed, position and the like of the motor itself or a controlled object connected to the motor is detected, and the motor is controlled according to the result of detection is well known. Examples of the apparatus using as a drive source the motor driven by such control include a recording apparatus.

An apparatus well known as this recording apparatus is a printer. In the printer, for example, so called a serial type printer having a recording head mounted thereon, and having a carriage undergoing scanning in a reciprocating manner in the direction vertical to the direction in which a recording medium (hereinafter referred to as "recording paper" or "paper") such as a paper or film is transported, and carrying out recording by having the carriage scanned while transporting the recording paper is transported is widely adopted in terms of easy construction.

On the other hand, a various kinds of recording systems are used for the recording heads of these recording apparatuses. For the recording system, the wire dot system, heat-sensitive system, heat transfer system, ink jet system, electrophotographic system and the like are widely known, and above all, the ink jet system is widely used in terms of coloration, enhanced resolution and silence.

In this serial type printer, the scan drive of the carriage is one of the important technical factors in recording operations. For the drive source of the carriage, stepping motors and DC motors are used, and above all, the DC motor is used in conjunction with an encoder system detecting the speed and position of the carriage because the DC motor is excellent in silence compared to the stepping motor. The DC motor is generally driven by the feedback control system in which the speed and position of the carriage is detected by the encoder system, and the motor is controlled according to the deviations from the command speed and command position.

Furthermore, even if the stepping motor is used as a drive source, the encoder system may be used. Here, the command speed is a speed that should be essentially achieved in timing with which the speed of the carriage has been detected, and the command position is a position that should be reached in timing with which the position of the carriage has been detected.

Also, the method of controlling the scan drive of the carriage varies depends on the scan position of the carriage and the situation of recording operations. For example, unless the carriage is always scanned at almost a constant speed at the time of recording, it may be difficult to carry out recording in an appropriate position in a recording medium, thus raising the possibility that the quality of recorded products is compromised.

After passing through the recording area, on the other hand, the carriage must have its traveling speed reduced for stopping at a predetermined position. If the degree of this speed reduction is not appropriate, the carriage may fail to stop at the predetermined position, thus raising the possibility that the subsequent operations are hindered. From this point of view, in most instances, control is performed focusing on the speed so that the carriage can be scanned at an appropriate speed when the carriage undergoes acceleration and the carriage travels at a constant speed, and control is performed focusing on the position so that the carriage can be stopped at an appropriate position when the carriage has its speed reduced.

When the DC motor and encoder system described above are used to control the drive of the carriage, the following feedback control is often performed.

First, here, assuming that the feedback control process is carried out at predetermined time intervals, for example at intervals of 1 ms, the feedback control process will briefly be described below.

Based on the previously required ultimate target position and speed to be attained by the carriage, the ultimate speed and position to be attained by the carriage, i.e. command speed and command position are calculated at each time of control. Explaining one example of the process for calculating the command speed and command position at the time when the carriage undergoes acceleration here, the command speed V (t) and the command position X (t) of the carriage at each time of control are calculated from a preset acceleration distance L, an ultimate speed VT to be attained at the time when the carriage travels at a constant speed, and a preset acceleration $\alpha$.

Assuming that acceleration $\alpha$ is a change in speed between control timing periods, for example, the value at each time of control is calculated for the command speed V (t) in accordance with the equation: V (t)=V (t−1)+$\alpha$. Similarly, for the command position X (t), a command speed V (t) determined from the calculated command speed V (t) is added at each time of control, namely the command position X (t) is calculated in accordance with the equation: X (t)=V (t)+V (t−1)+ . . .

Therefore, in this case, the command speed V (t) is a value linearly increasing with time to the speed reached at the time of traveling at a constant speed, and the command position X (t) is calculated as a value exponentially increasing to a value equivalent to the acceleration distance.

Furthermore, for the command speed V (t), the ultimate speed VT to be attained in the constant speed-region may be considered as the command speed at the time of acceleration without conducting the above calculation. In this case, the command speed V (t) is a fixed value that does not increase with time. Here, the subscript (t) refers to a value at predetermined time of control processing, and the subscript (t−1) refers to a value at the immediately previous time of processing.

Then, the actual position of the carriage is determined from the result of encoder system detection, and a deviation from the command position is calculated, and based on the result thereof, a speed controlled variable Vc (t) is calculated. Subsequently, a speed deviation VE (t) is calculated from the command speed V (t) and the actual speed v (t) of the carriage, and a new speed controlled variable Vc (t) is calculated based on this speed deviation VE (t).

Then, a controlled variable M to be applied to the motor according to this speed controlled variable Vc (t) is calculated, and this motor controlled variable M is applied to the motor to control the drive of the motor. As a result, the motor is driven in accordance with the command speed and command position.

In this way, the motor itself and the controlled object connected to the motor are driven in accordance with the command speed and command position to attain an ultimate speed (ultimate speed VT) and move to and stop at an ultimate position (ultimate target position XT), whereby a series of control is ended.

Also, whether the ultimate target position XT has been reached or not is determined as a general practice, and if it is determined that the position has been reached, application of the controlled variable (also called driven variable) to the motor is stopped and so on to proceed to the next operation as a general practice.

Here, if considering the operation of stopping at the ultimate target position XT, it is often difficult in general to have the object stopped at the ultimate target position XT, and therefore a predetermined range n, namely XT−n/2~XT+n/2 is set for the ultimate target position XT, and when the controlled object stops in this range, it is determined that the controlled object moves to and stops at the ultimate target position and so on as a general practice.

However, the above method of controlling the motor and the recording apparatus using this method have the following problems.

That is, if the motor and the controlled object such as a carriage connected to the motor are driven so that the controlled object attains the ultimate speed and position in accordance with the command speed and command position, more than predetermined time may be required until the motor and the controlled object connected to the motor stop, or it is determined that they stop in the stopped state at the ultimate target position XT.

Also, time required for the motor and the controlled object to stop may vary considerably depending on apparatuses such that the motor and the controlled object can stop quickly for some apparatuses, and it takes much time for them to stop for other apparatuses.

In addition, a strange noise may be emitted in the stopped state at the ultimate target position XT.

In this situation, the motor has its speed reduced from its running condition to "0" before reaching the ultimate position, or does not have its speed reduced to "0" even after passing by the ultimate position, and so on, thus making it impossible to stop at the ultimate position.

This will be described using operations of the carriage of the recording apparatus as an example.

FIG. 20 is a graph showing the command speed V (t) and actual speed v (t) of the carriage and the motor controlled variant M versus time.

For example, reference character A in the figure shows a situation in which reduction in speed is started from the constant-speed state and the ultimate position is reached, but the position is passed by because the speed cannot be reduced enough, so that a slight movement is made in an opposite direction to consume time wastefully for stopping at the ultimate position. Here, time is similarly consumed wastefully in the case where the speed is reduced to "0" before the ultimate position is reached. That is, in this case, the stopped state occurs before the ultimate position is reached, and thereafter control is performed so that a movement to the ultimate position is made to make a slight movement.

In addition, if the parameter in feedback control or the like is inappropriate, oscillation may occur in the stopped state. Such a situation is shown in FIG. 21.

In this case, an acceptable range is set such that a predetermined range n including positions ahead and behind the ultimate target position XT, i.e. XT−n/2~XT+n/2 is established, and it is determined that the carriage stops at the ultimate target position when the carriage stops at a point within the predetermined range n.

First, the upper part of FIG. 21 shows a situation in which the carriage moves from the left side in the figure toward the ultimate target position XT, and thereafter passes by the ultimate target position XT and further goes beyond the acceptable range even though the carriage is controlled. The carriage is controlled so as to go back to the ultimate target position XT from a certain position beyond the acceptable range, and therefore the carriage is driven in the opposite direction.

When the carriage is driven in the opposite direction, however, the carriage moves to a position at a longer distance from the ultimate target position XT than the previous position, and this movement is repeated to bring the carriage into an oscillation state, as shown. Here, FIG. 22 shows a relation between the position of the carriage and time when the carriage is brought into the oscillation state, and as shown in FIG. 22, it can be understood that the carriage moves to and from around the ultimate target position, and the movement of the carriage is not converged.

Also, the lower part of FIG. 21 shows a situation in which the carriage temporarily stops before the carriage reaches the acceptable range of the ultimate target position XT. Also in this case, the carriage is driven so that the carriage approaches to the ultimate target position XT after it temporarily stops, but the carriage passes by the ultimate target position XT and the acceptable range, and is consequently brought into the oscillation state as shown in FIG. 22.

Such phenomena are mainly ascribable to difficulty of optimization of controlled parameters. The principal reason for difficulty of optimization is that time delay occurs in so called a transfer system such as transfer between the motor and the carriage, and a period of time between the instant when the speed and position are detected by the encoder sensor and the instant when the motor gains a drive force by way of processing for feedback control, and the delayed time is different for each apparatus due to variations in parts of apparatuses, ambient temperature and humidity, and variations in performance of motors, and the load on the motor is different for each apparatus, and so on.

Also, for optimizing the controlled parameter and the like for the apparatus, it can be considered that so called "learning" in which the controlled parameter is changed predetermined timing to identify an optimal value is performed, but in this case, the apparatus should be driven for the "learning," and therefore the apparatus cannot be operated efficiently. Also, in this case, the control method is complicated, and cannot be easily applied to inexpensive apparatuses.

SUMMARY OF THE INVENTION

The present invention has been made to solve the above problems, and the object of the invention is to provide a control apparatus capable of performing stop operations of a controlled object stably and efficiently and a method thereof, a recording apparatus capable of providing stable operations and carrying out recording efficiently even in the recording apparatus using the control and a method of controlling the same.

According to the present invention, the foregoing object is attained by providing a control apparatus performing control to move a controlled object to a position within an acceptable ultimate target range including positions ahead and behind an ultimate target position, comprising: detection means for detecting the position of the controlled object; drive means for driving the controlled object; and control means for controlling the drive means so that the controlled object is reverse-driven if the controlled object is situated beyond the ultimate target position, and stopping the operation of the drive means if the controlled object is situated beyond the acceptable ultimate target range, as a result of the detection by the detection means.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 21 illustrates the controlled condition at the time of stopping of the carriage in particular when the carriage is controlled by the conventional control method.

DETAILED DESCRIPTION OF THE PREFERRED EMBODIMENTS

Figure 1:
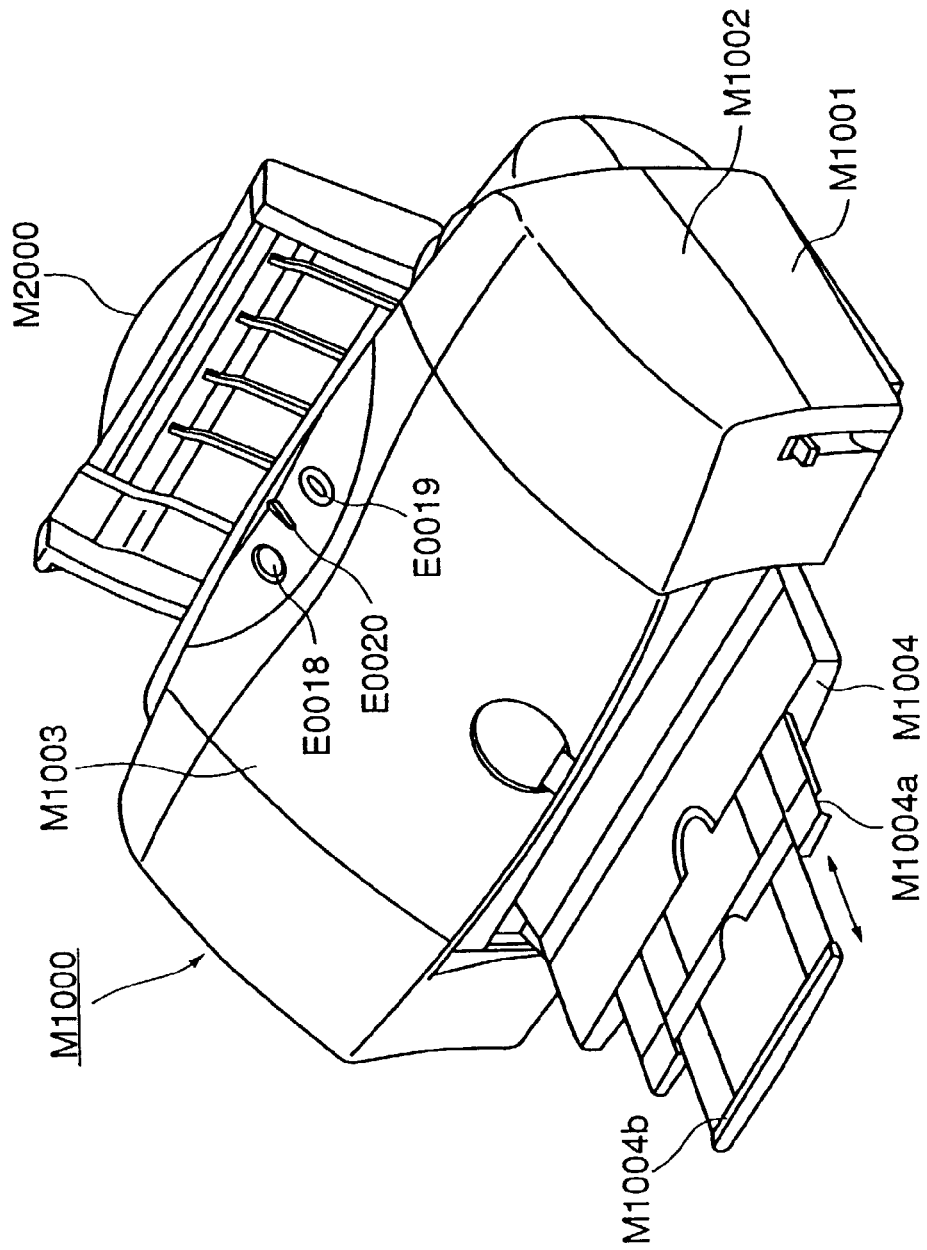
FIG. 1 is a perspective view showing an external construction of an ink jet recording apparatus of one embodiment of the present invention.

The situation in which the method of controlling a motor according to the present invention is applied to a recording apparatus will be described below by referring to the drawings.

Furthermore, in First to Third Embodiments described below, we take up as an example a printer using an ink jet recording system.

First Embodiment

Apparatus Body

Figure 2:
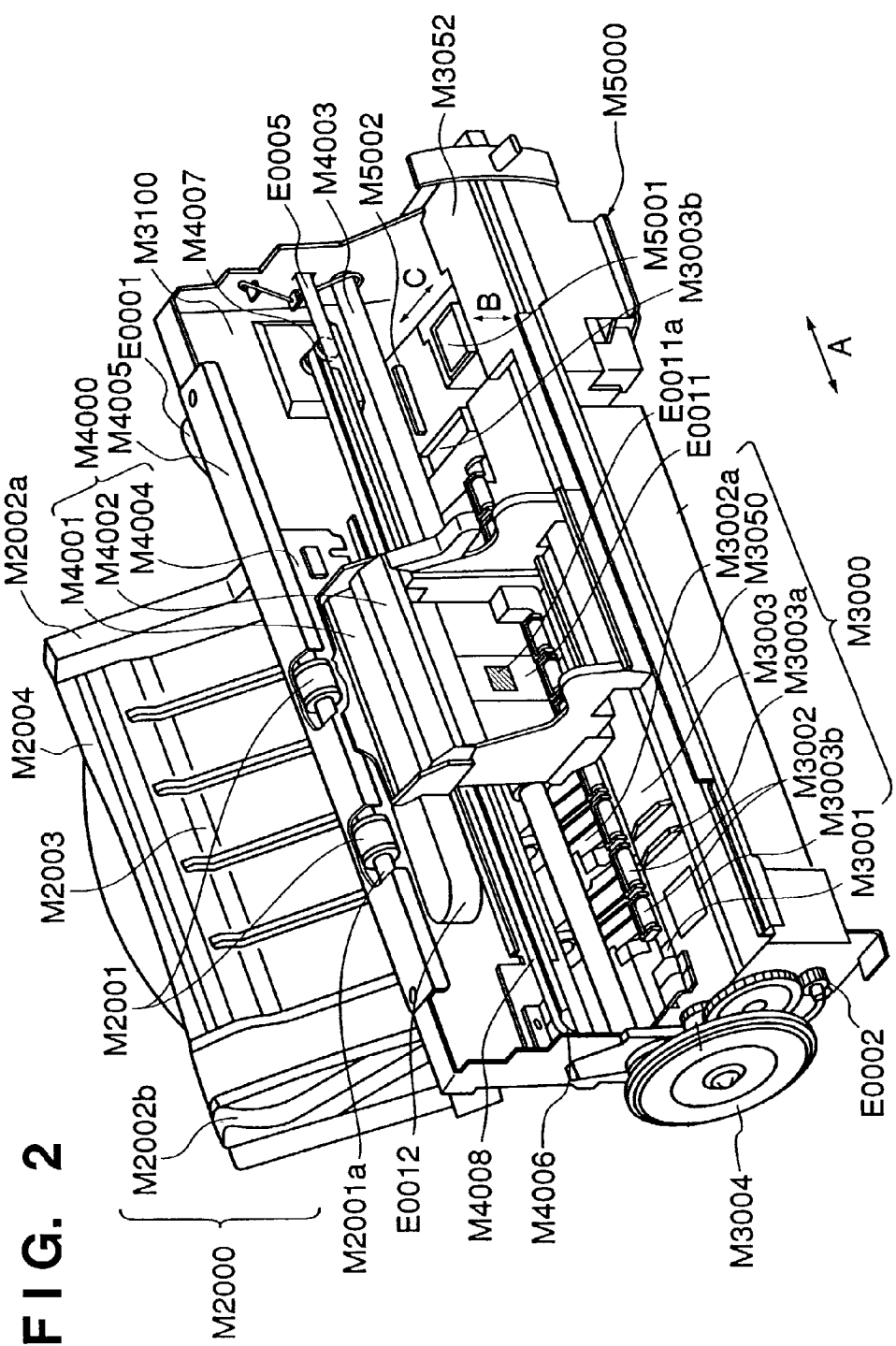
FIG. 2 is a perspective view showing a construction of the recording apparatus of FIG. 1 with an enclosure member removed.
Figure 3:
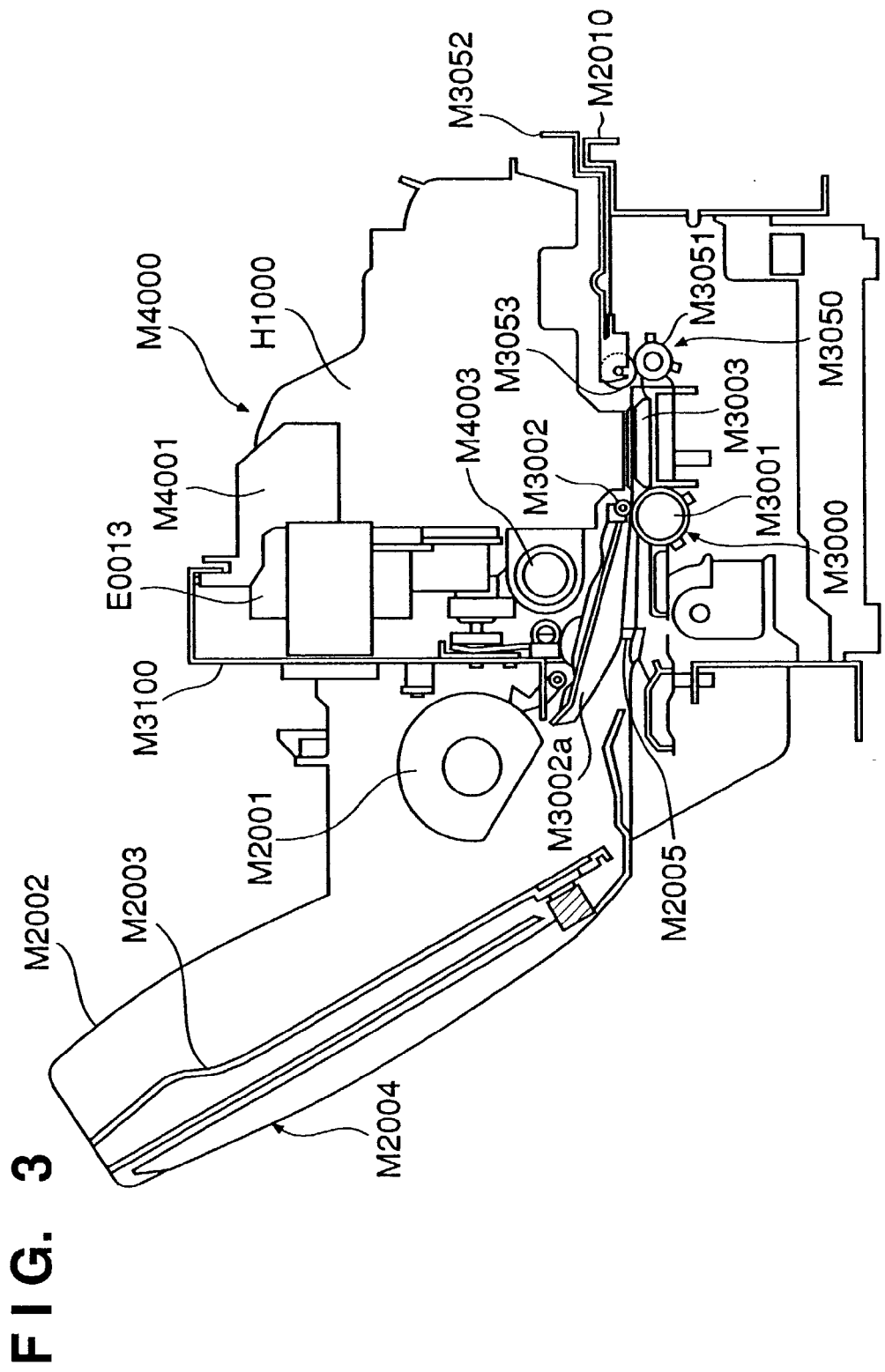
FIG. 3 is a schematic sectional view showing a construction of the recording apparatus of FIG. 1 with the enclosure member removed.

FIGS. 1, 2 and 3 show an outline construction of a printer using the ink jet recording system of First Embodiment.

In FIG. 1, an apparatus body M1000 forming the outer shell of the printer in this embodiment is comprised of an enclosure member, including a lower case M1001, an upper case M1002, an access cover M1003 and a discharge tray M1004, and a chassis M3100 (see FIG. 2) accommodated in the enclosure member.

The chassis M3100 is made of a plurality of plate-like metal members with a predetermined rigidity to form a skeleton of the recording apparatus, and holds various recording operation mechanisms described later.

The lower case M1001 forms roughly a lower half of the apparatus body M1000, and the upper case M1002 forms roughly an upper half of the apparatus body M1000. These upper and lower cases, when combined, form a hollow structure having an accommodation space therein to accommodate various mechanisms described later, and an opening is formed in its top face and front face.

In addition, the discharge tray M1004 has one end portion thereof rotatably supported on the lower case M1001, and when the discharge tray M1004 is rotated, the opening formed in the front face of the lower case M1001 can be opened or closed. Therefore, when the recording operation is to be performed, the discharge tray M1004 is rotated forwardly to open the opening so that recording sheets P can be discharged and successively stacked. The discharge tray M1004 accommodates two auxiliary trays M1004a, M1004b, and these trays can be drawn out forwardly as required.

The access cover M1003 has one end portion thereof rotatably supported on the upper case M1002, and can open or close an opening formed in the upper surface of the upper case. By opening the access cover M1003, a recording head cartridge H1000 or an ink tank H1900 installed in the apparatus body M1000 can be replaced.

At the upper rear surface of the upper case M1002, a power key E0018 and a resume key E0019 are provided in such a manner the keys can be pressed, and an LED (E0020) is provided. When the power key E0018 is pressed, the LED (E0020) can light up indicating to an operator that the apparatus is ready for recording.

The LED (E0020) has a variety of display functions, such as informing the operator of printer conditions as by changing its blinking intervals and color. Furthermore, when a trouble or the like is eliminated, the resume key E0019 is pressed to resume the recording.

Next, a recording operation mechanism installed and held in the apparatus body M1000 of the printer will be explained.

[Recording Operation Mechanism]

The recording operation mechanism consists of: an automatic feed unit M2000 to automatically feed a recording sheet P into the apparatus body M1000; a transport unit M3000 to guide the recording sheet P fed one at a time from the automatic feed unit M2000, to a desired recording position and to guide the recording sheet P from the recording position to a discharge unit M3050; a recording unit M4000 to perform a desired recording on the recording sheet P carried to the transport unit M3000; and a recovery unit M5000 to recover the recording unit M4000 and the like.

Next, the detailed configuration of each mechanism unit will be described.

(Automatic Feed Unit)

The automatic feed unit M2000 dispatches in a horizontal state the recording sheet P stacked at an angle of about 30° to 60° relative to the horizontal plane, and feeds the recording sheet P from a feed port (not shown) into the apparatus body M1000 while maintaining the roughly horizontal state.

Specifically, the automatic feed unit M2000 comprises a sheet feed roller M2001, a sheet feed roller axis M2100a, a movable side guide M2002, a platen M2003, an ASF (Auto Sheet Feeder) base M2004, and a detaching hook and separate sheet (not shown). Of these, the ASF base M2004 roughly forms an outer shell of the automatic feed unit M2000. The movable side guide M2002 consists of a pair of sheet guides and M2002a and M2000b. One sheet guide M2002b can be moved horizontally, and is adaptable to the horizontal widths of various recording sheets P.

Figure 6:
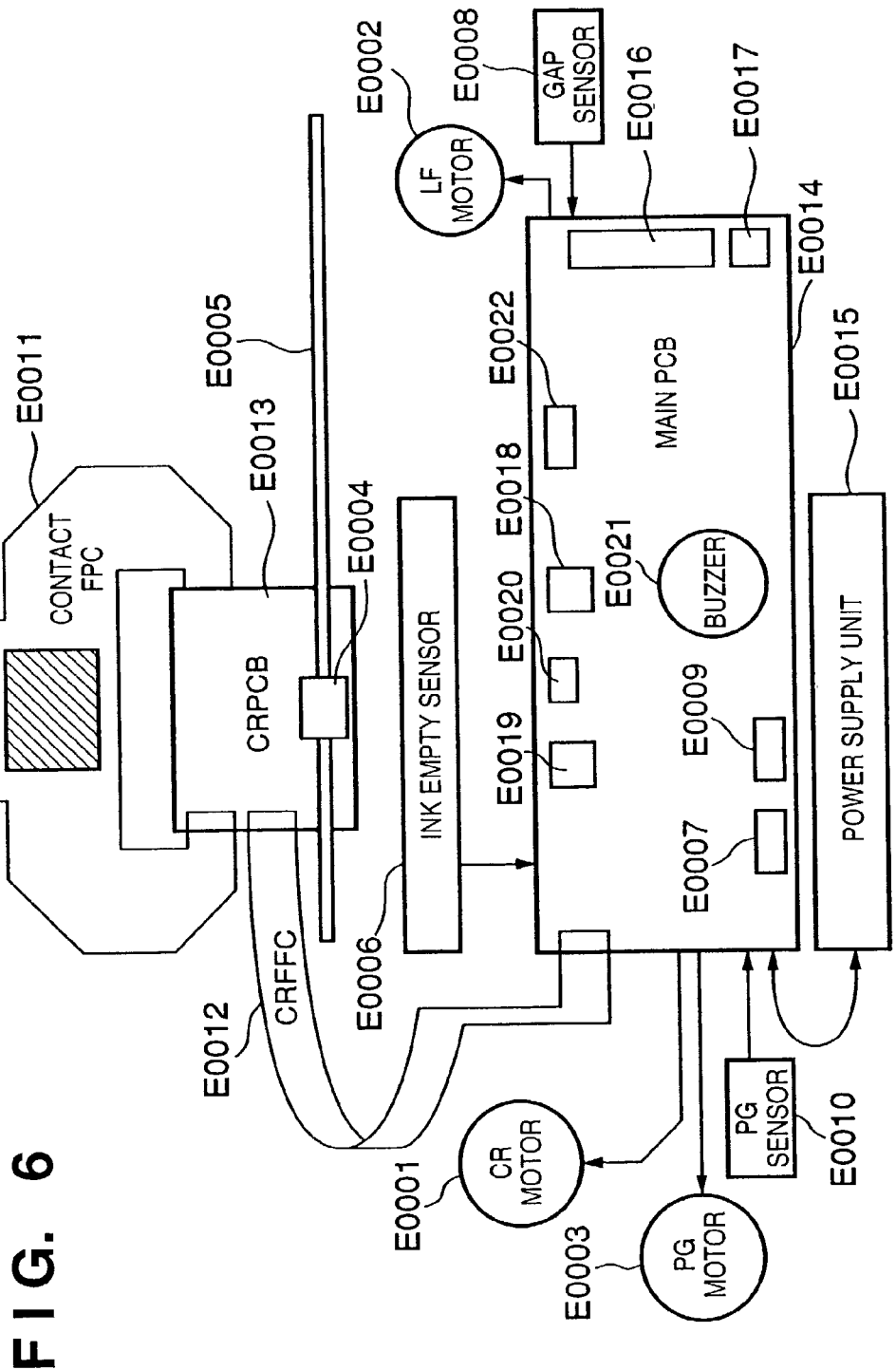
FIG. 6 is a block diagram showing the overall configuration of an electric circuitry of the ink jet recording apparatus of one embodiment of the present invention.

In the automatic feed unit M2000, a plurality of sheet feed rollers M2001 are rotatably provided through a predetermined row of gears and the sheet feeder roller axis M2001a from a PG motor E0003 of a recovery unit M5000 (FIG. 6). For the recording sheets P stacked on the platen M2003, the sheet feed roller M2001 is rotated when the PG motor E0003 is driven, and the uppermost sheet in the stacked recording sheets P is detached and dispatched one after another by means of the detachment action by the detaching hook and separate sheet, and is transported to the transport unit M3000.

Here, in the transport pathway of the recording sheets extending from the automatic feed unit M2000 to the transport unit M3000, a PE lever M2005 is pivotally attached to the chassis M3100 fixed in the apparatus body M1000. Then, the recording sheet P detached and transported from the automatic feed unit M2000 is passed through this transport pathway, and one end portion of the recording sheet P presses one end portion of the PE lever M2005 and causes the PE lever M2005 to rotate, whereby a PE sensor E007 (FIG. 6) senses the rotation of the PE lever M2005, and hence senses that the recording sheet P has entered the transport pathway.

(Transport Unit)

The transport unit M3000 comprises an LF roller M3001, a pinch roller M3002, a platen M3003 and so on. The LF roller M3001 is fixed to a drive shaft rotatably supported on the chassis M3100 and the like, and is rotated by the LF motor E0002 through a row of LF gears M3004 (FIG. 6).

The pinch roller M3002 is pivotally attached to the tip portion of a pinch roller holder M3002a rotatably supported on the chassis M3100, and abuts against the LF roller M3001 with a coiled pinch roller spring energizing the pinch roller holder M3002a. When the LF roller M3001 is rotated, the pinch roller M3002 rotates in association with the rotation of the LF roller M3001, and has the recording sheet P transported with the recording sheet P held between itself and the LF roller M3001.

A platen rib M3003a to support and guide the transported recording sheet P and a preliminary discharge port M3003b for preliminary discharge of the recording head H1001 are provided in the platen M3003.

In the transport unit M3000 configured in this way, the LF motor E0002 (FIG. 6) is driven after the expiration of a predetermined time period after the transport operation by the sheet feed roller M2001 of the automatic feed unit M2000 is stopped. Thereby, the recording sheet P with its tip portions abutting against nip portions of the LF roller M3001 and the pinch roller M3002 is transported to the recording start position on the platen M3003 with the rotation of the LF roller M3001.

(Discharge Unit)

The discharge unit M3050 has a sheet discharge roller M3051 (FIG. 3) capable of being rotated by transferring thereto the drive of the LF motor E0002 (FIG. 6) through a predetermined row of gears, and has provided in a spur stay M3052 a spur M3053 rotating in association with the rotation of the sheet discharge roller M3051. The discharge unit M3050 comprises a sheet discharge tray M1004 accommodating the recording sheet P discharged by the sheet discharge roller M3051 and spur M3053, and so on.

When the recording on the recording sheet P is ended, and the rear end of the recording sheet P is withdrawn from between the LF roller M3001 and the pinch roller M3002, the recording sheet P is transported only by the sheet discharge roller M3051 and the spur M3053 to complete the discharge of the recording sheet P.

(Recording Unit)

The recording unit M4000 consists of a carriage M4001 supported movably on a carriage axis M4003, and a recording head cartridge H1000 mounted detachably on this carriage M4001.

First, the recording head cartridge H1000 will be described with reference to FIGS. 4 and 5.

Figure 4:
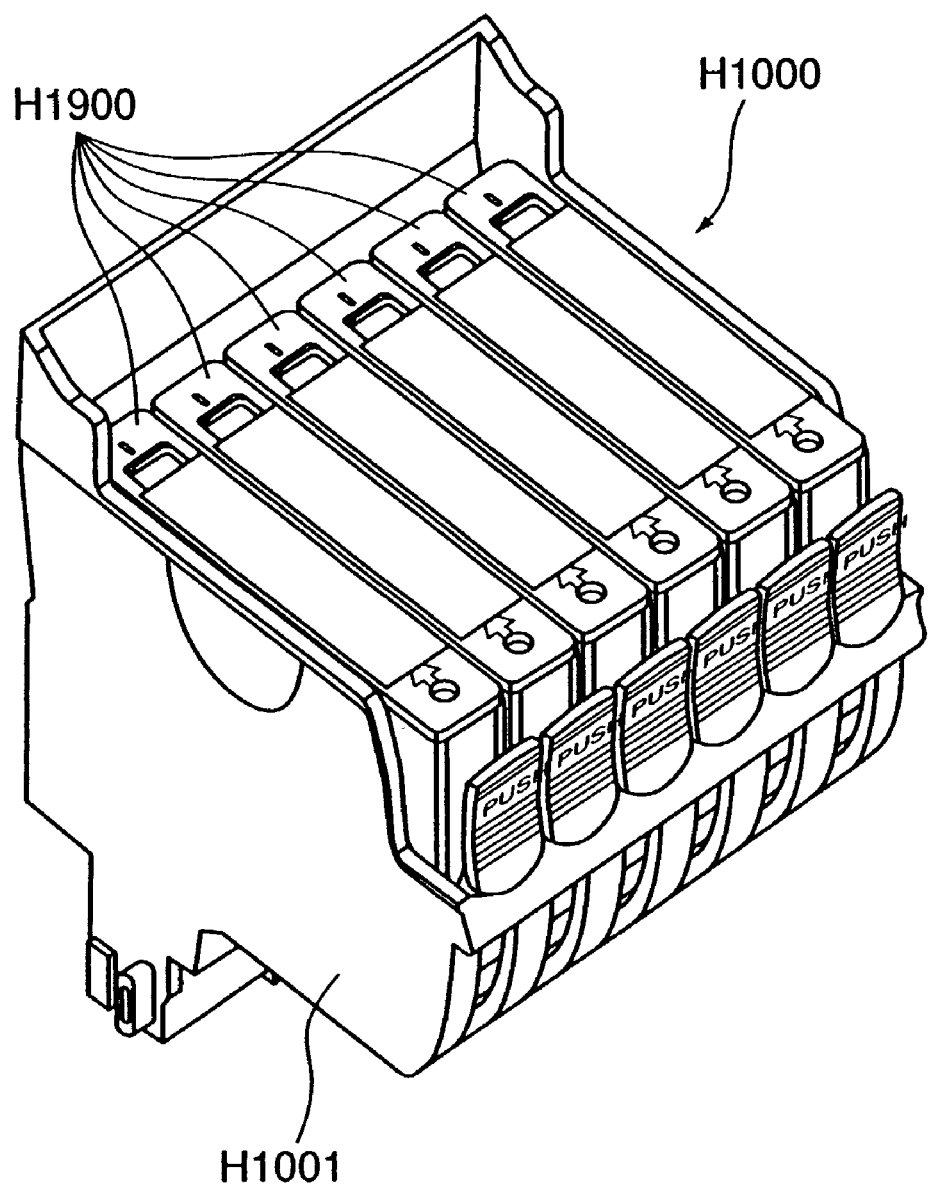
FIG. 4 is a perspective view showing an overall recording head cartridge of one embodiment of the present invention.

As shown in FIG. 4, the recording head cartridge H1000 has an ink tank H1900 for storing ink, and a recording head H1001 for discharging from a nozzle the ink supplied from the ink tank H1900 in accordance with recording information. For the recording head H1001, so called a cartridge system is employed in which the recording head is mounted detachable on the carriage M4001 described later.

Figure 5:
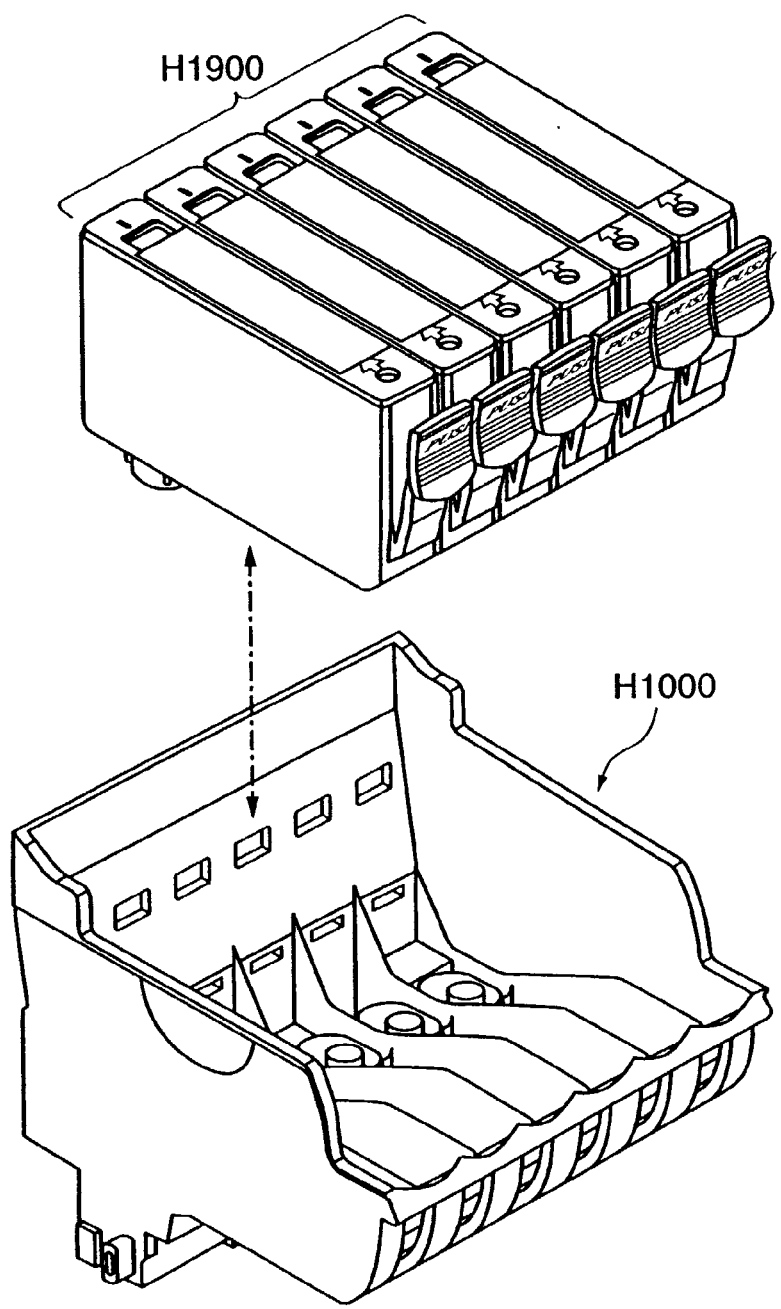
FIG. 5 is an exploded perspective view showing the recording head cartridge of FIG. 4 with an ink tank.

For the recording head cartridge H1000, independent ink tanks of colors including, for example, black, light cyan, light magenta, cyan, magenta and yellow are prepared as ink tanks for enabling photographic high quality color print, and each ink tank can be attached to and detached from the recording head H1001 as shown in FIG. 5.

For the recording head H1001, a recording element substrate (not shown) with a plurality of pores for discharging inks (referred to also as discharge slots and nozzles) formed therein is provided in the lower part of FIGS. 4 and 5. If the recording head H1001 is mounted on the carriage M4001, the recording head H1001 opposes to the recording sheet P transported to the transport unit M3000 of the recording apparatus. Here, the recording element substrate is provided with electrothermal converters each corresponding to each of the discharge slots together with the plurality of discharge slots, and electrical wirings are laid for supplying electricity to these electrothermal converters. The electrical wirings are supplied with electricity from a main PCB (E0014) of the recording apparatus (FIG. 6) when electrically connected to the portion of contact with the carriage M4001 provided on the back face of the recording head H1001 and fitted to the carriage M4001.

Next, the carriage M4001 will be described with reference to FIGS. 2 and 3.

The carriage M4001 is supported slidably on the carriage axis M4003 and a carriage rail M4005, and is provided with a head set lever M4002 engaging with the carriage M4001 to guide the recording head H1001 to the position in which the carriage M4001 is mounted, and pressing the recording head H1001 so that the recording head H1001 is set in a predetermined mounted position.

The head set lever M4002 is provided in the upper part of the carriage M4001, and a spring (not shown) is provided in the portion of its engagement with the recording head H1001, and the recording head H1001 is pressed by means of the force of this spring to mount the head set lever M4002 on the carriage M4001.

A contact flexible print cable (contact FPC) E0011 is provided in another portion of the carriage M4001 with the recording head H1001. A contact portion E0011a on the contact FPC (E0011) is electrically connected to a contact portion (external signal input terminal) (not shown) provided in the recording head H1001, and thereby various information for recording can be given and received, and electricity can be supplied to the recording head H1001.

Further, the contact FPC (E0011) is drawn to the both side faces of the carriage M4001 and connected to a carriage substrate E0013 mounted on the back face of the carriage M4001.

The carriage substrate E0013 is electrically connected to a main PCB (E0014) (FIG. 6) (described later) provided in the chassis M3100 by a carriage flexible flat cable (CRFFC) E0012. The other end portion of the CRFFC (E0012) is fixed to the chassis M3100 with a FFC holder M4004, and is lead to the back face side of the chassis M3100 through a hole (not shown) provided in the chassis M3100 and connected to the main PCB (E0014).

An encoder sensor E0004 (FIG. 6) is provided in the carriage substrate E0013. Information on an encoder scale E0005 installed in parallel to the carriage axis M4003 between the both side faces of the chassis M3100 is detected, whereby the position, the scan speed and the like of the carriage M4001 can be detected. For example, the encoder sensor E0004 is an optical transmission sensor, and the encoder scale E0005 is such that a light blocking portion to block detection light from the encoder sensor E0004 and a transmission portion through which detection light is transmitted are alternatingly printed at predetermined pitches on a film made of resin such as polyester using a method such as a photomechanical process.

Thus, the position of the carriage M4001 moving along the carriage axis M4003 can be detected as appropriate by pushing the carriage M4001 against one side plate of the chassis M3100 provided in the end portion of the carriage M4001 on the scanning track, and then counting based on the pushing position the number of patterns formed in the encoder scale E0005 by the encoder sensor E0004 in association with the scanning of the carriage M4001.

The carriage M4001 is fixed to a carriage belt M4008 installed roughly in parallel to the carriage axis M4003 between an idler pulley M4006 and a carriage motor pulley M4007. The carriage motor pulley M4007 is driven by the driving of the carriage motor (CR motor) E0001, and thereby the carriage M4001 can be scanned along the carriage axis M4003. Here, the idler pulley M4006 is supported on a coil spring (not shown), and appropriate tension is always applied to the carriage belt M4008.

(Recovery Unit)

The recovery unit M5000 comprises cleaning means for removing contaminants deposited on the recording element substrate (not shown) of the recording head H1001, and suction means for normalizing an ink channel extending from the ink tank H1900 to the recording element substrate of the recording head H1001.

A cap M5001 is provided opposite to the recording element substrate of the recording head H1001 and connected to the PG motor E0003 through a row of gears and a cam mechanism (not shown), and is capable of moving in the direction B in the figure.

The recording element substrate of the recording head H1001 mounted on the carriage M4001 moves to, and then stops at, the position opposite to the cap M5001 (referred to also as capping position), and at this time, the cap M5001 is driven vertically upward in FIG. 2, and thereby can cover the recording element substrate to provide a capping state.

In this capping state, when the PG motor E0003 and a pump mechanism (not shown) connected to a predetermined row of gears are operated, the ink is suctioned and discharged through the recording element substrate from the ink tank H1900 of the recording head H1001.

The recovery unit M5000 is provided with a wiper blade M5002 as means for cleaning the recording element substrate. The wiper blade M5002 is connected to the PG motor E0003 through a predetermined row of gears, and is capable of moving in the C direction in the figure. The carriage M4001 with the recording head H1001 mounted thereon moves to and then stops at a predetermined wiping position, and thereby the wiper blade M5002 is driven frontward in FIG. 2. By this operation, the wiper blade M5002 abuts against the recording element substrate of the recording head H1001 to perform cleaning.

Furthermore, in the case where the wiper blade M5002 is operated to clean the recording element substrate, the cap M5001 is moved to a position at some distance from the recording element substrate.

One of recovery operations of the recording head H1001 independent of the operations of the recovery unit M5000 is a preliminary discharge operation. When the recording head H1001 discharging inks of two or more colors is used to perform the aforesaid suction operation and wiping operation, a problem may arise associated with mixture of inks, and this preliminary discharge operation is intended to remedy this situation.

Such a phenomenon is caused by an ink sucked out from an ink discharge slot by suction at the time of suction operation entering a discharge slot for an ink of different color, and inks of various colors deposited on the periphery of the ink discharge slot at the time of wiping operation being pushed into a discharge slot for an ink of different color by the wiper. In this case, when the next recording is started, the initial portion may undergo discoloration (or color mixture) to degrade an image. Discharging in advance some inks undergoing color mixture immediately before recording in order to eliminate this color mixture phenomenon is referred to as preliminary discharge.

In First Embodiment, as shown in FIG. 2, the preliminary discharge slots M3003b are provided in proximity to the both end portions of the platen M3003, and the recording element substrate of the recording head H1001 is moved to a position opposite to the preliminary discharge slot M3003b in predetermined timing to perform operations. At this time, a preliminary discharge slot performing preliminary discharge is selected in accordance with a predetermined process.

(Configuration of Electric Circuit)

Figure 7:
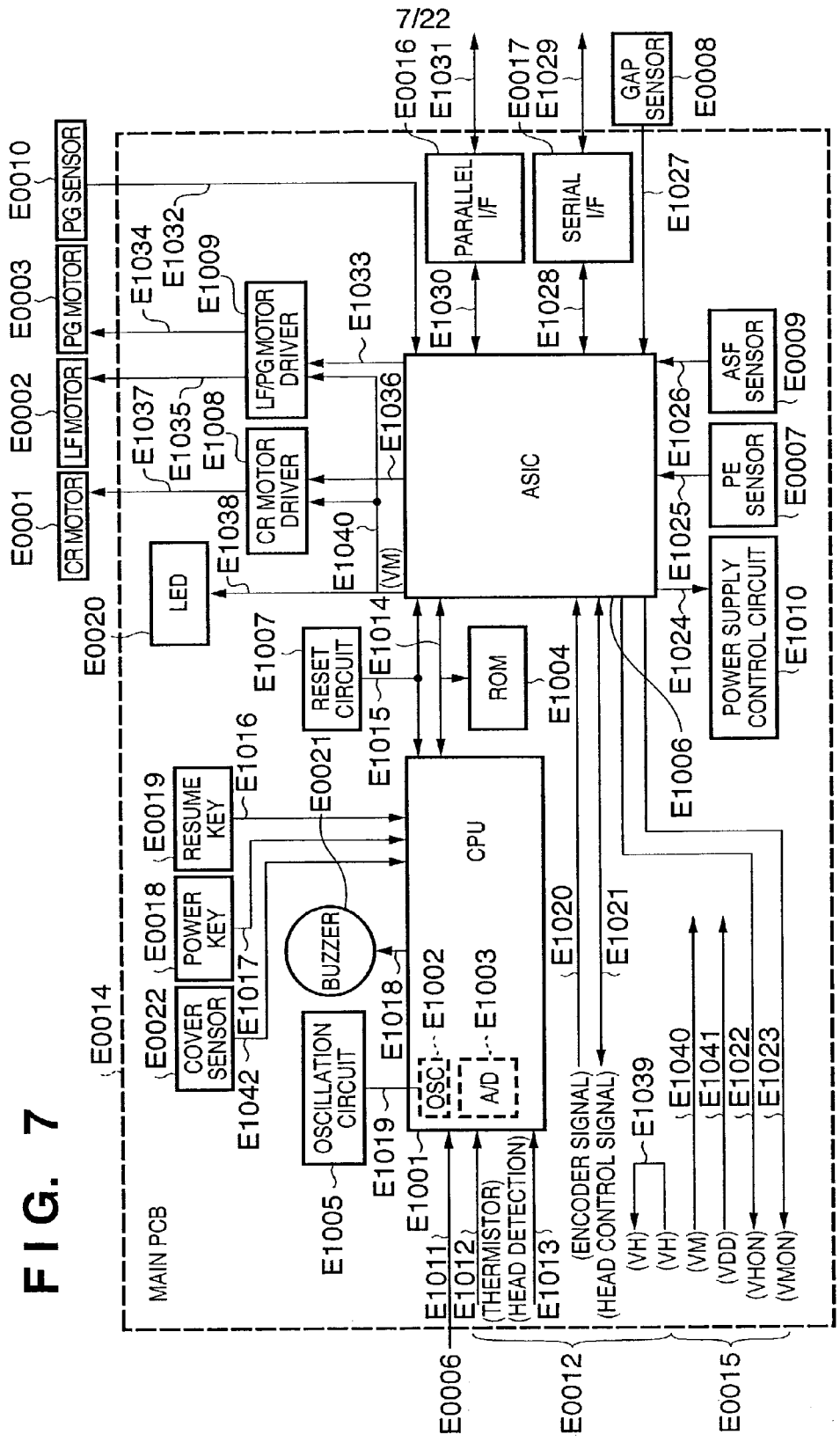
FIG. 7 is a block diagram showing the detailed configuration of part of the electric circuitry of the ink jet recording apparatus of one embodiment of the present invention.

FIGS. 6 and 7 schematically show the overall configuration of the electric circuit in First Embodiment.

The electric circuit in First Embodiment mainly comprises a carriage substrate (CRPCB) E0013, a main PCB (Printed Circuit Board) E0014 and a power supply unit E0015.

The power supply unit E0015 is connected to the main PCB (E0014) to supply a variety of drive power.

The carriage substrate E0013 is mounted on the carriage M4002 (FIG. 2), and transforms signals to and from the recording head H1001 through the contact FPC (E0011). In addition, based on a pulse signal output from an encoder E0004 as the carriage M4001 moves, the carriage substrate E0013 detects a change in the positional relation between an encoder scale E0005 and the encoder sensor E0004, and outputs its output signal to the main PCB (E0014) through the CRFFC (E0012).

Further, the main PCB (E0014) is a printed board unit that controls the operation of various parts of the recording apparatus, and has on the substrate IO ports for an ink empty sensor E0006, a paper end detection sensor (PE sensor) E0007, an ASF sensor E0009, a cover sensor E0022, a parallel I/F (E0016), a serial I/F (E0017), a resume key E0019, a LED (E0020), a power key E0018, a buzzer E0021 and the like. Further, the main PCB (E0014) is connected to the CR motor E0001, the LF motor E0002 and the PG motor E0003 and controls the operations thereof, and also has connection interfaces with the ink empty sensor E0006, the CAP sensor E0008, the PG sensor E0010, the CRFFC (E0012) and the power supply unit E0015.

Reference number E1001 denotes a CPU, which has therein an oscillator OSC (E1002), and is connected to an oscillation circuit E1005 to generate a system clock based on an output signal E1019 of the oscillation circuit E1005. The CPU E1001 is connected to a ROM (E1004) and an ASIC (Application Specific Integrated Circuit) E1006 through a control bus E1014, and according to a program stored in the ROM (E1004), controls the ASIC (E1006), and checks the status of an input signal E1017 from the power key E0018, an input signal E1016 from the resume key E0019, a cover detection signal E1042 and a head detection signal (HSENS) E1013. In addition, the CPU E1001 drives the buzzer E0021 according to a buzzer signal (BUZ) E1018, and checks the status of an ink empty detection signal (INKS) E1011 and a thermistor temperature detection signal (TH) E1012, and also performs various other logic operations and makes conditional decisions to control the operation of the apparatus.

The head detection signal E1013 is a head mount detection signal entered from the recording head cartridge H1000 through the CRFFC (E0012), the carriage substrate E0013 and the contact FPC (E0011). The ink empty detection signal is an analog signal output from the ink empty sensor E0006. The thermistor temperature detection signal E1012 is an analog signal from a thermistor (not shown) provided on the carriage substrate E0013.

Reference number E1008 denotes a CR motor driver serving as means for driving the CR motor E0001, which uses a motor power supply (VM) E1040 as a driving source to generate a CR motor drive signal E1037 according to a CR motor control signal E1036 from the ASIC (E1006) to drive the CR motor E0001. Reference number E1009 denotes an LF/PG motor driver which uses the motor power supply E1040 as a driving source to generate an LF motor drive signal E1035 according to a pulse motor control signal (PM control signal) E1033 from the ASIC (E1006), thereby driving the LF motor E0002 and generating a PG motor drive signal E1043 to drive the PG motor E0003.

Reference number E1010 denotes a power supply control circuit which controls the supply of electricity to respective sensors and the like with light emitting elements according to a power supply control signal E1024 from the ASIC (E1006). The parallel I/F (E0016) transfers a parallel I/F signal E1030 from the ASIC (E1006) to a parallel I/F cable E1031 connected to external circuits. The parallel I/F (E0016) transfers a signal from the parallel I/F cable E1031 to the ASIC (E1006). The serial I/F (E0017) transfers a serial I/F signal E1028 from the ASIC (E1006) to a serial I/F cable E1029 connected to external circuits. The serial I/F (E0017) also transfers a signal from the serial I/F cable E1029 to the ASIC (E1006).

On the other hand, a head power (VH) E1039, a motor power (VM) E1040 and a logic power (VDD) E1041 are supplied from the power unit E0015. A head power ON signal (VHON) E1022 and a motor power ON signal (VMOM) E1023 are input from the ASIC (E1006) to the power supply unit E0015 to perform the ON/OFF control of the head power E1039 and the motor power E1040, respectively. The logic power (VDD) E1041 supplied from the power supply unit E0015 is voltage-converted as required and supplied to various parts inside or outside the main PCB (E0014).

The head power E1039 is smoothed on the main PCB (E0014) and then sent out to the CRFFC (E0012) to be used for driving the recording head cartridge H1000.

Reference number E1007 denotes a reset circuit which detects a reduction in the logic power voltage E1040, and supplies a reset signal (RESET) E1015 to the CPU (E1001) and the ASIC (E1006) to initiate them.

The ASIC (E1006) is a single-chip semiconductor integrated circuit, and is controlled by the CPU (E1001) through the control bus E1014 to output the CR motor control signal E1036, the PM control signal E1033, the power control signal E1024, the head power ON signal E1022 and the motor power ON signal E1023 described previously and so on, and transfers signals to and from the parallel I/F (E0016) and the serial I/F (E0017). In addition, the ASIC E1006 detects the status of a PE detection signal (PES) E1025 from the PE sensor E0007, an ASF detection signal (ASFS) E1026 from the ASF sensor E0009, a GAP detection signal (GAPS) E1027 from the GAP sensor E0008, and a PG detection signal (PGS) E1032 from the PG sensor E0010, and sends data representing the statuses to the CPU (E1001) through the control bus E1014, and the CPU (E1001) controls the operation of an LED drive signal E1038 based on the input data to turn on or off the LED (E0020).

Further, the ASIC E1006 checks the status of an encoder signal (ENC) E1020, generates a timing signal, and interfaces with the recording head cartridge H1000 to control the recording operation by a head control signal E1021. Herein, the encoder signal (ENC) E1020 is an output signal of the CR encoder sensor E0004 input through the CRFFC (E0012). The head control signal E1021 is supplied to the recording head cartridge H1000 through the CRFFC (E0012), the carriage substrate E0013 and the contact FPC (E011).

In this way, the ASIC E1006 detects an encoder signal from the encoder sensor E0004 mounted on the carriage substrate E0013 to generate a timing signal. Based on this timing signal, desired recording information and the like, the ASIC E1006 interfaces with the recording head cartridge H1000 to control the recording operation, and controls the operation of the carriage M4001 described later based on the encoder signal. The CPU (E1001) controls the operations of various parts of the recording apparatus in cooperation with the ASIC (Application Specific Integrated Circuit) E1006.

The CR motor E0001, the LF motor E0002 and the PG motor E0003 are controlled based on control signals of the CPU (E1001) through the CR motor driver E1008 and the LF/PC motor driver E1009, respectively. Furthermore, in the case of First Embodiment, the LF/PG motor driver E1009 is independently provided in the same element.

Next, the operation of the recording apparatus of First Embodiment will be described with reference to FIG. 8.

Figure 8:
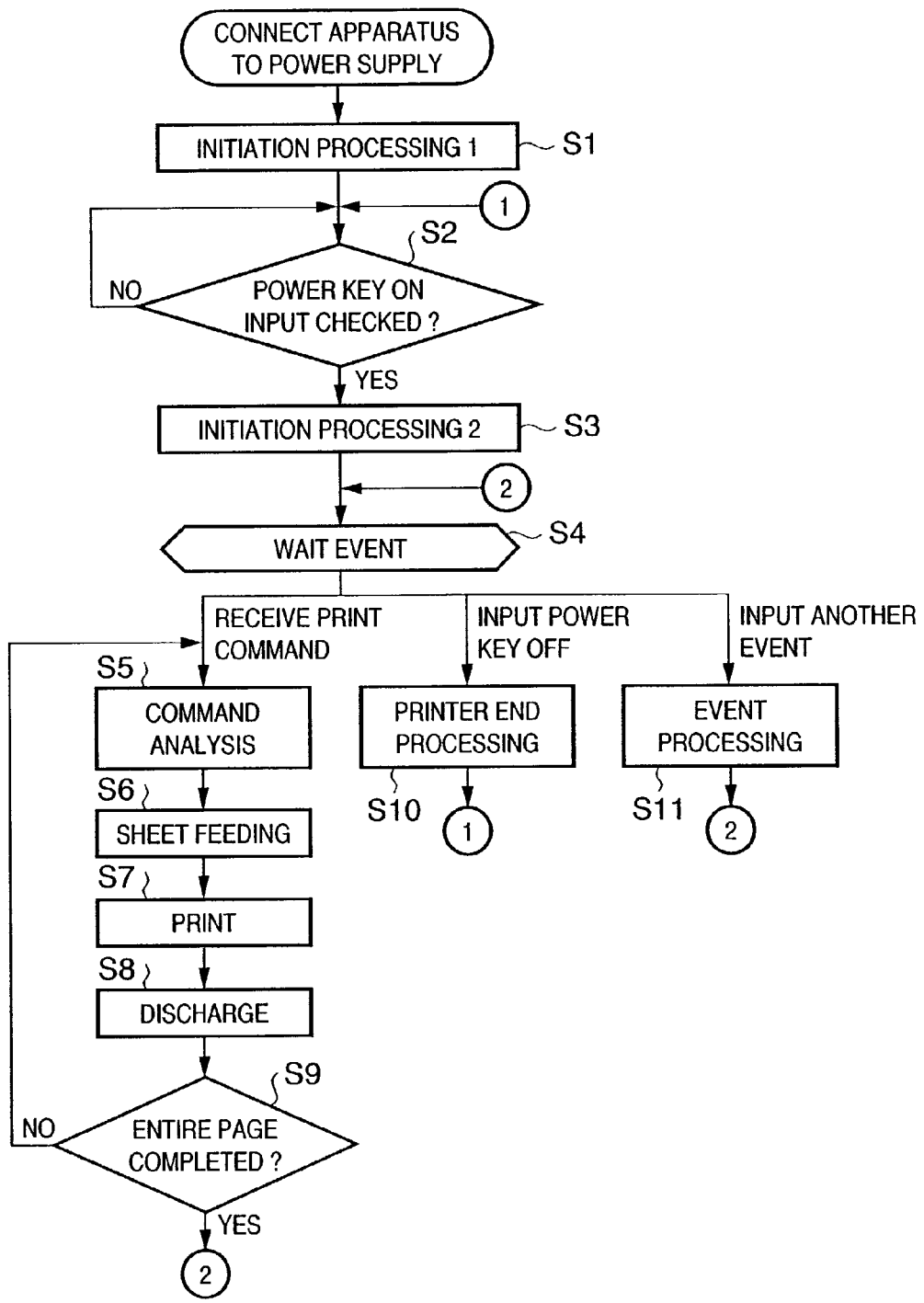
FIG. 8 is a flow chart showing a recording operation of the recording apparatus of First Embodiment of the present invention.

FIG. 8 is a flow chart showing the operation of the recording apparatus of First Embodiment of the present invention.

When the recording apparatus is connected to an AC power supply, first initialization of the recording apparatus is first performed at step S1. In this first initialization, the electric circuit system including the ROM and RAM in the apparatus is checked to ensure that the apparatus is electrically operable.

Next, at step S2, whether the power key E0018 provided on the upper case M1002 of the apparatus body M1000 is turned on or not is determined. If it is determined that the power key E0018 is turned on (YES in step S1), the processing moves to step S3 where second initialization is performed. On the other hand, if it is determined that the power key E0018 is not turned on (NO in step S1), the process in on standby until the power key E0018 is turned on.

At step S3, second initialization is performed. Here, various drive mechanisms and the head system of the apparatus are checked. That is, when various motors are initialized, and head information of the recording head H1001 is read, whether the apparatus is normally operable is checked.

Next, at step S4, an event is waited. That is, a command event from the external I/F, a panel key event from the user operation, an internal control event and the like are monitored, and when any of these events occurs, processing corresponding to the event is executed.

For example, when a print command event is received from the external I/F at step S4, the processing moves to step S5. When a power key event from the user operation occurs, the processing moves to step S10. Further, if another event occurs, the processing moves to step S11.

At step S5, the print command from the external I/F is analyzed, a specified paper kind, paper size, print quality, paper feeding methods and the like are determined, and data representing the result of the determination is stored in RAM in the apparatus. Next, at step S6, the paper is fed according to the paper kind, paper size, print quality, paper feeding method and the like specified at step S5 until the recording sheet P is situated at the recording start position.

Next, at step S7, the recording operation is performed. In this recording operation, the recording data sent from the external I/F is stored temporarily in the recording buffer, and then the CR motor E0001 is started to move the carriage M4001 in the scanning direction, and the recording data stored in the recording buffer is supplied to the recording head H1001 to record one line. When one line of recording data has been recorded, the LF motor E0002 is driven to rotate the LF roller M3001 to transport the recording sheet P in the sub-scanning direction. After this, the above operation is executed repetitively until one page of the recording data from the external I/F is completely printed, at which time the processing moves to step S8.

At step S8, the LF motor E0002 is driven to rotate the sheet discharge roller M3051 to feed the sheet until it is decided that the recording sheet P is completely fed out of the apparatus, at which time the recording sheet P is completely discharged onto the sheet discharge tray M1004.

Next at step S9, whether all the pages that need to be recorded have been recorded is determined. If there are pages that remain to be recorded (NO in step S9), the processing returns to step S5, and the steps S5 to S9 are repeated. On the other hand, when all the pages that need to be recorded have been recorded (YES in step S9), the recording operation is ended. After this, the processing moves to step S4 where the next even is waited.

On the other hand, at step S10, the printing termination processing is performed to stop the operation of the apparatus. That is, to turn off various motors and the recording head H1001, the apparatus is rendered ready to be cut off from power supply and the apparatus is turned off. After this, the processing moves to step S4 where the next event is waited.

At step S11, other event processing is performed. For example, processing corresponding to the command of recovery processing of the recording head from various panel keys of the apparatus and the external I/F and the recovery event that occurs internally. After this, the processing moves to step S4 where the next event is waited.

Next, the control of the CR motor E0001 and the carriage M4001 in the recording apparatus having this configuration will be described.

As described previously, the carriage M4001 uses as a driving source the CR motor E0001 driven by a CR motor control signal from the ASIC (E1006).

Figure 9:
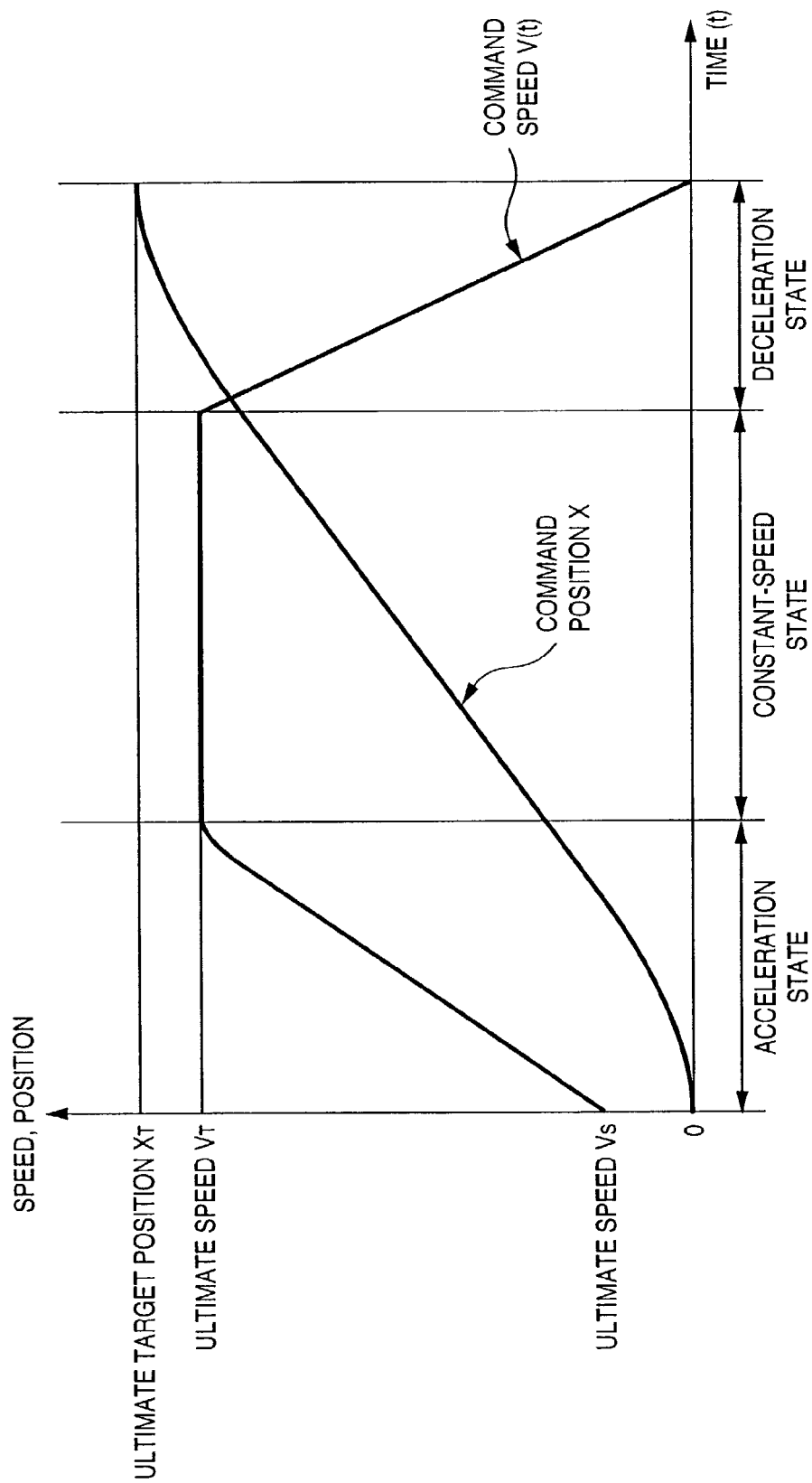
FIG. 9 illustrates the controlled condition of the carriage of the recording apparatus of First Embodiment of the present invention.

FIG. 9 is a graph showing how the command speed and command position of the carriage M4001 are changed with time.

The operation state of the carriage M4001 can be classified broadly into three statuses: the acceleration state in which the static carriage M4001 is accelerated to gain a predetermined constant speed; the constant-speed state in which ink drops are discharged from the recording head H1001 mounted on the carriage M4001 to carry out recording on the recording sheet guided to the platen M3003 of the recording apparatus; and the deceleration state in which the carriage M4001 has its speed reduced to stop at a predetermined position.

In the case of First Embodiment, the command speed V (t) in the acceleration state is calculated so that the speed increases with time on a proportional basis. Here, a variety of processing for performing drive scanning of the carriage M4001 is performed by the CPU (E1001) periodically at predetermined intervals of, for example, 1 ms.

The time representing the acceleration state shown in FIG. 9 is acceleration time, similarly the time representing the deceleration state is deceleration time, the position that must be finally reached by one time scanning of the carriage M4001 is a ultimate target position XT, and the speed of scanning performed in the constant-speed state is an ultimate speed VT.

Figure 10:
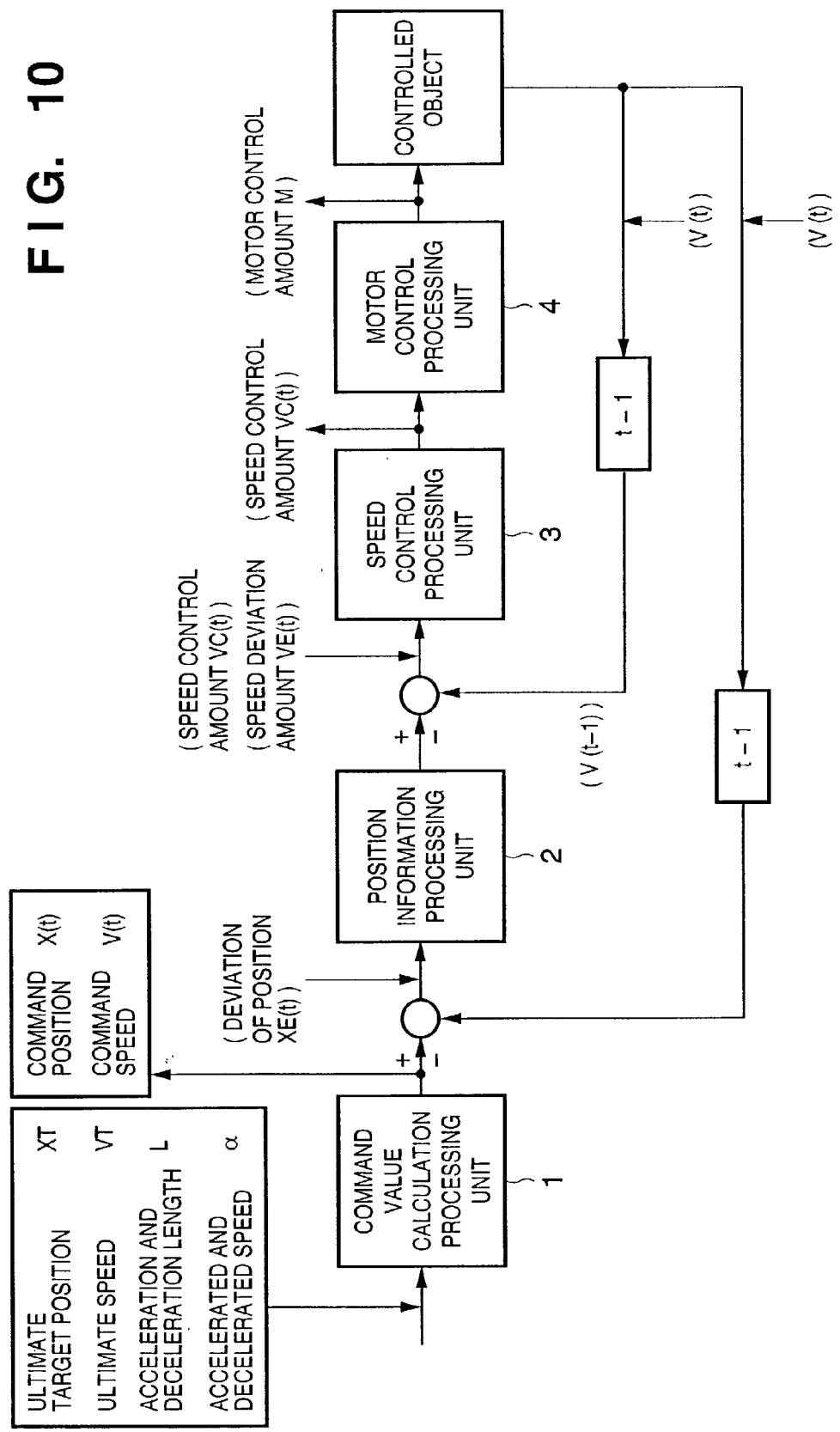
FIG. 10 is a block diagram schematically showing a control circuitry of a carriage motor of First Embodiment of the present invention.

FIG. 10 is a block diagram schematically showing the control circuit of the CR motor E0001 of First Embodiment of the present invention.

Furthermore, this control circuit is provided, for example, on the main PCB (E0014) and in the ASIC (E1006). Alternatively, a program code for achieving the processing of the control circuit is stored in the ROM (E1004), and the CPU (E1001) reads this program code and executes the processing.

In First Embodiment, the control of the CR motor E0001 is feedback control based on information of the position and speed of the carriage M4001 as shown in FIG. 10.

The control circuit mainly comprises a command value calculation processing unit 1 that calculates the command values of the speed and position of the carriage M4001 at each predetermined time, a position control processing unit 2 that controls the position of the carriage M4001, a speed control processing unit 3 that controls the speed, and a motor control processing unit 4 that converts the calculated values calculated by the position control processing unit 2 and the speed control processing unit 3 into values suitable for inputs to the CR motor driver E1008 for driving the CR motor E0001 serving as a driving source of the carriage M4001.

Furthermore, in First Embodiment, information of the position and speed of the carriage M4001 is detected based on the encoder sensor E0004 and the encoder scale E0005. The detected information of the position and speed is stored as appropriate in a DRAM (not shown) provided in the ASIC (E1006). The CPU (E1001) acquires the stored information of the position and speed for each time of feedback control processing. The command value calculation processing unit 1 calculates the command speed V (t) and the command position X (t) at each time of processing as shown in FIG. 9.

Next, the command value calculation processing executed by the command value calculation processing unit 1 will be described with reference to FIG. 11.

Figure 11:
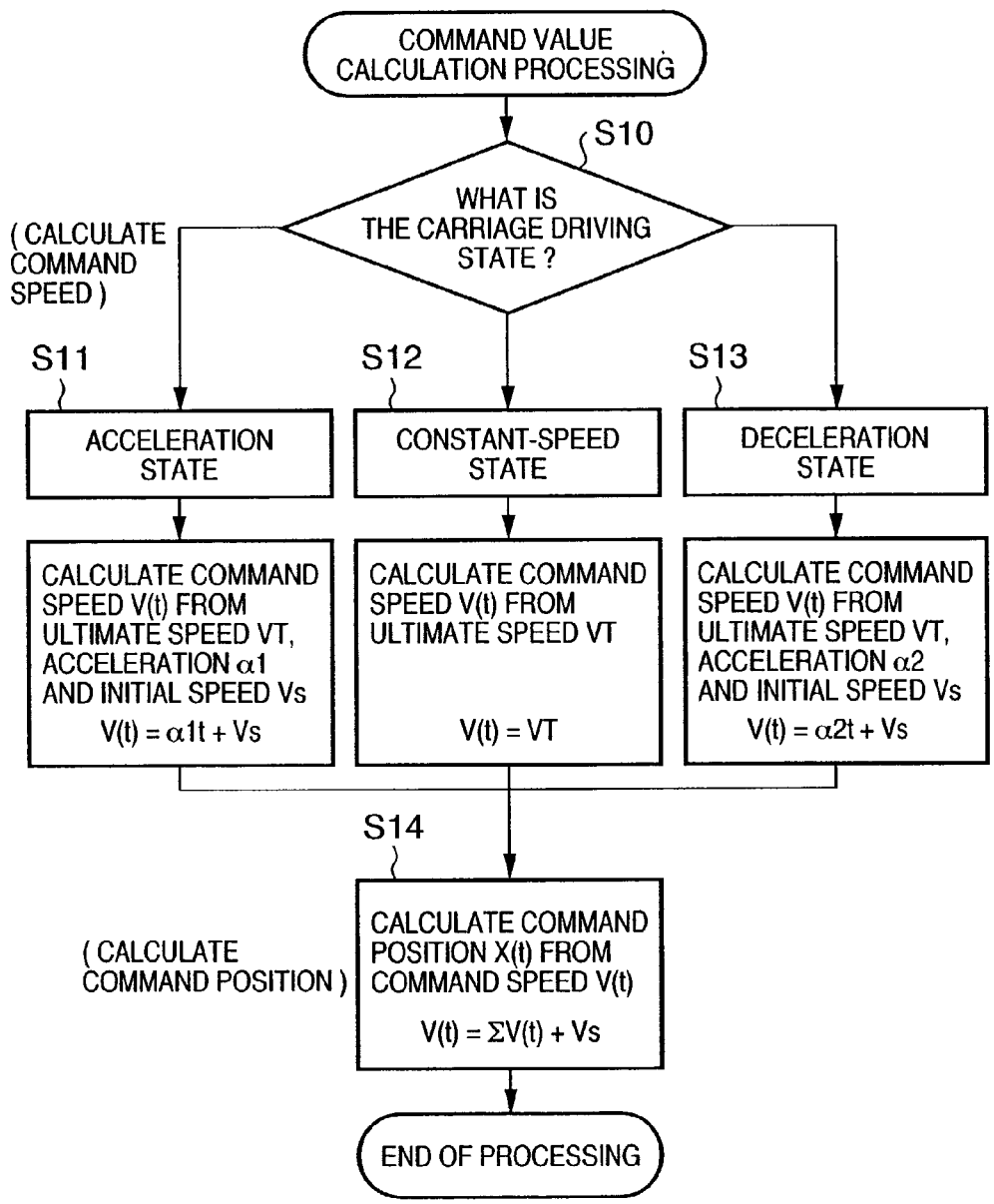
FIG. 11 is a flow chart showing command value calculation processing of First Embodiment of the present invention.

FIG. 11 is a flow chart showing the command value calculation processing of First Embodiment of the present invention.

First, at step S10, the CPU (E1001) determines the state of the carriage M4001: acceleration state, constant-speed state, or deceleration state, from the result of measurements by the encoder sensor E0004 mounted on the carriage M4001.

If it is determined at step S10 that the carriage M4001 is in the acceleration state, the processing moves to step S11, where the command speed V (t) is calculated from values including the speed VT to be achieved in the predefined constant-speed state, the acceleration α1 and the initial speed Vs. In the case of First Embodiment, the command speed V (t) is calculated based on the following equation.

$$\text{command speed } V(t) = \alpha 1 t + Vs$$

If it is determined at step S10 that the carriage M4001 is in the constant-speed state, the processing moves to step S12, where the command speed V (t) is calculated based on the premise that the command speed V (t) equals the ultimate speed VT, namely the equation of command speed V (t)=ultimate speed VT holds.

If it is determined at step S10 that the carriage M4001 is in the deceleration state, the processing moves to step S13, where the command speed V (t) is calculated from the predefined ultimate speed VT and the acceleration α2 during deceleration. In the case of First Embodiment, the command speed V (t) is calculated based on the following equation.

$$\text{command speed } V(t) = \alpha 2 t + VT$$

Here, since the acceleration α2 during deceleration is a negative (−) value, a command speed V (t) that decreases linearly is obtained.

After the command speed V (t) is calculated according to the driven state of the carriage M4001, the processing moves to step S14, where the command speed V (t) is added at each time of processing to calculate the command position X (t). In the case of First Embodiment, the processing is performed at time intervals of 1 ms, and therefore the unit time of the command speed V (t) is 1 ms. In this way, by directly adding this command speed V (t), the movement length, namely the command position X (t) can be calculated. Furthermore, the subscript (t) represents a time value at predetermined time of processing.

Next, the position control processing unit 2 calculates a deviation between the command position X (t) calculated by the command value calculation processing unit 1 and the actual position x (t) of the carriage M4001 driven through a series of feedback control, namely a deviation of position XE (t). Then, a speed control amount VC (t) is calculated from the deviation of position XE (t) and the command speed V (t) calculated by the command value calculation processing unit 1. At this time, the actual command position X (t) of the carriage M4001 is a result obtained based on the output to the CR motor E0001 calculated at the immediately previous time of processing in which position control processing is performed, and thus (t−1) is added to the command position X (t) when it is presented.

In the case of First Embodiment, position control processing performed by the position control processing unit 2 is processing performed only when the carriage M4001 has been shifted to the deceleration state, and is not performed when the carriage M4001 is either in the acceleration state or the constant-speed state. Here, whether the carriage M4001 has been shifted to the deceleration state is determined from the position of the carriage M4001, and the deceleration starting position at which deceleration is started is calculated from a predefined deceleration length. It is determined that the carriage M4001 has been shifted to the deceleration state when the encoder scale E0005 and the encoder sensor E0004 detects that the carriage M4001 is situated at the acceleration starting position.

Next, position control processing performed by the position control processing unit 2 will be described with reference to FIG. 12.

Figure 12:
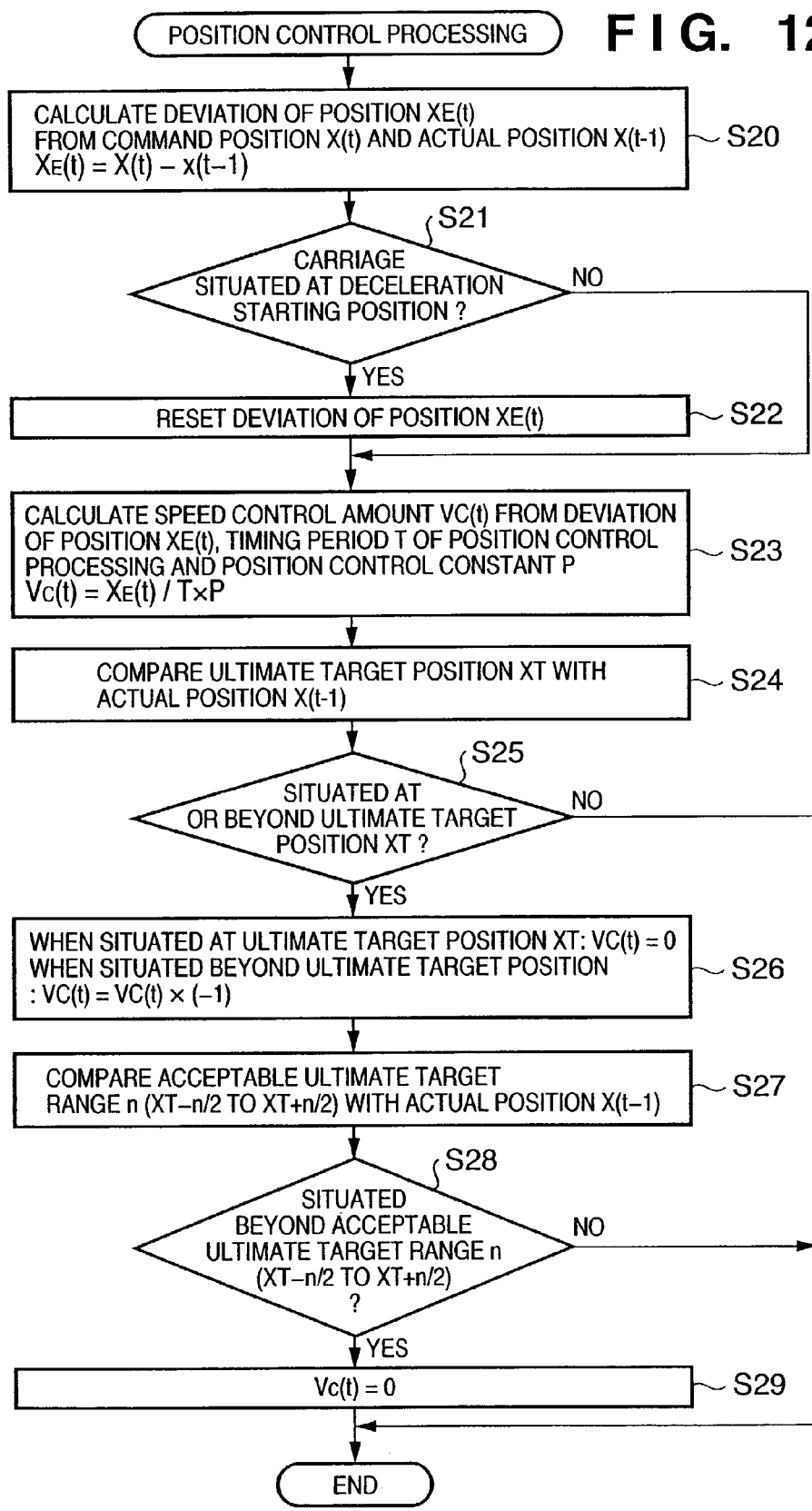
FIG. 12 is a flow chart showing position control processing of First Embodiment of the present invention.

FIG. 12 is a flow chart showing the position control processing of First Embodiment of the present invention.

First, the actual position x (t−1) of the carriage M4001 is subtracted from the command position X (t) calculated by the command value calculation processing unit 1 to calculate a deviation of position XE (t).

Next, at step S21, whether the carriage M4001 is situated at the deceleration starting position or not is determined. If the carriage M4001 is not situated at the deceleration starting position (NO in step S21), the processing moves to step S23. On the other hand, if the carriage M4001 is situated at the deceleration starting position (YES in step S21), the processing moves to step S22. At step S22, the value of deviation of position XE (t) calculated at step S20 is reset to "0" by the CPU (E1001) serving as means for controlling deviations of position.

Here, during a period of time between the instant when the driving of the carriage M4001 is started and the instant when the carriage M4001 is shifted to the deceleration state, there is usually a deviation with respect to time between the command position X (t) and the actual position x (t−1) of the carriage M4001, in which the actual position x (t−1) of the carriage M4001 is behind the command position X (t). As a result, at the time when the carriage M4001 is shifted to the deceleration state, there is a deviation of position XE (t). Thus, at the deceleration starting position, the deviation of position XE (t) is temporarily reset, so that the command position X (t) equals the actual position x (t−1) of the carriage M4001 in this timing.

Next, at step S23, the deviation of position XE (t) is divided by a timing period T in which the position control processing is performed for dealing with the deviation of position XE (t) as a speed. After this, the obtained value is multiplied by a position control constant P to calculate a speed control amount Vc (t). Furthermore, if it is determined at step S21 that the carriage M4001 is no longer situated at the deceleration starting position, but is already in the deceleration state, the deviation of position XE (t) is not reset, but the speed control amount Vc (t) is immediately calculated according to the step S23.

Then, at step S24, the ultimate target position XT of the carriage M4001 is compared to the actual position x (t−1) Then, at step S25, whether the actual position x (t−1) is equal to or beyond the ultimate target position XT or not is determined. If the actual position x (t−1) is behind the ultimate target position XT (NO in step S25), the processing is ended. On the other hand, the actual position x (t−1) is equal to or beyond the ultimate target position XT (YES in step S25), the processing moves to step S26.

At step S26, if the actual position x (t−1) equals the ultimate target position XT, the speed control amount Vc (t) is 0. If the actual position x (t−1) is beyond the ultimate target position XT, the speed control amount Vc (t) is multiplied by −1 to be converted into a negative value.

Here, the speed control amount Vc (t) is converted into a motor control amount M suitable for the CR motor driver E1008 in the motor control processing unit 4, and the CR motor E0001 is driven according to the motor control amount M. If the speed control amount Vc (t) is a negative value, the speed control amount Vc (t) is calculated as a motor control amount M indicating a scanning in the direction opposite to the direction in which the carriage M4001 is scanned. That is, in the stop operation of the carriage M4001, if the carriage M4001 is situated beyond the ultimate target position XT in its scanning direction, the motor control amount M indicating a scanning in the opposite direction is immediately calculated by the motor control unit 4.

Then, at step S27, an acceptable ultimate target range n including positions ahead and behind the ultimate target position XT, n (XT−n/2 to XT+n/2) is compared to the actual position x (t−1) of the carriage. At step S28, whether the actual position x (t−1) is beyond the acceptable ultimate target range n (XT−n/2toXT+n/2) or not is determined. If the actual position x (t−1) is not beyond the acceptable ultimate target range (XT−n/2toXT+n/2) (NO in step S28), the processing is ended. On the other hand, if the actual position x (t−1) is beyond the acceptable ultimate target range n (XT−n/2toXT+n/2) (YES in step S28), the processing immediately moves to step S29 where the speed control amount Vc (t) is set to 0.

Here, when the speed control amount Vc (t) is set to 0, the driving of the motor is immediately stopped by the motor control processing unit 4.

Figure 13:
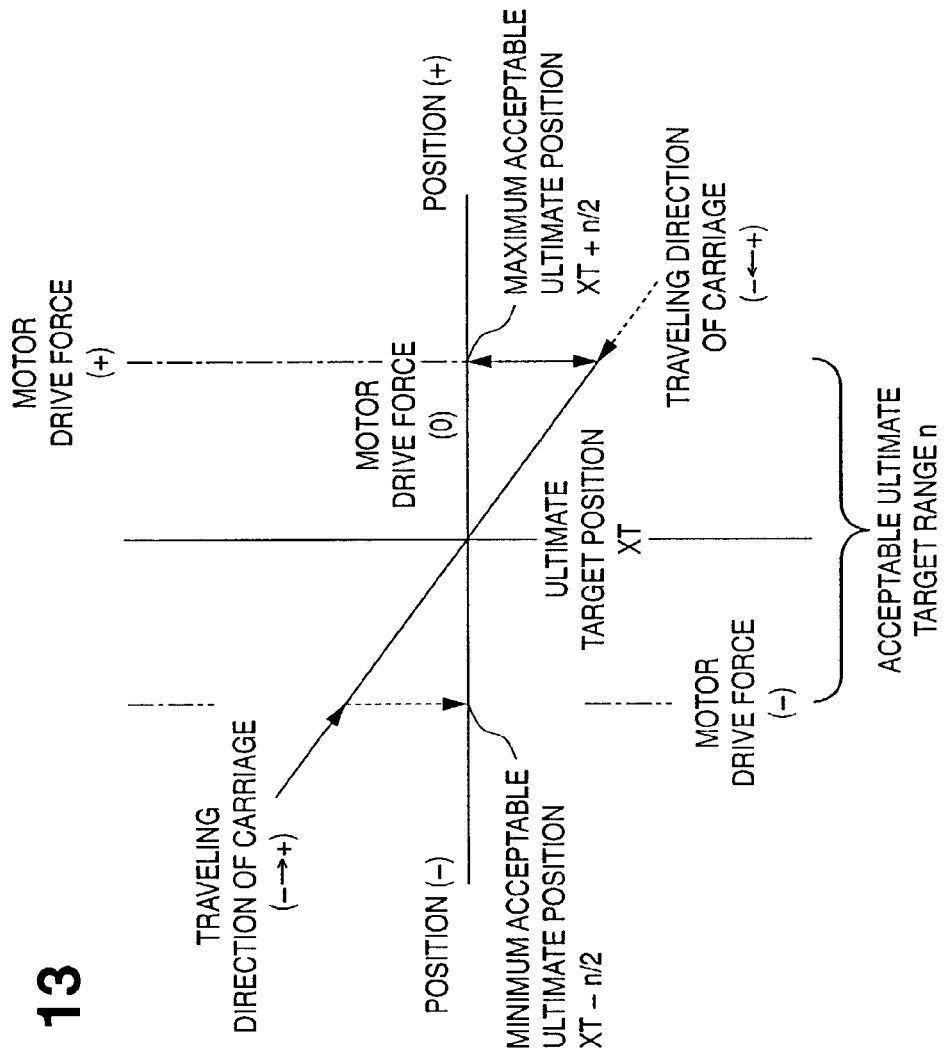
FIG. 13 illustrates a change in drive force of the motor by the position control processing of First Embodiment of the present invention.

The motor control amount M where control is performed in this way is shown in FIG. 13.

In this case, the motor control amount M is proportional to the previous speed control amount Vc (t), and is hence proportional to the drive force generated by the motor, and the same holds true for their changes.

First, the transition of the motor control amount M where the carriage M4001 moves in the − to + direction as shown by the solid arrow, toward the ultimate target position XT to be achieved will be described.

In this figure, the carriage M4001 moves to the ultimate target position XT according to the solid line arrow, and at the time when the carriage M4001 passes by the ultimate target position XT, the speed control amount Vc (t) is converted into a negative value through the processing in the step 26 of FIG. 12. Thereafter, when the carriage M4001 reaches the maximum acceptable ultimate position (XT+n/2), the speed control amount Vc (t) is set 0, and consequently the driving of the motor is stopped.

On the other hand, the same holds true for the transition of the motor control amount M where the carriage M4001 moves in the + to − direction as shown by the dotted arrow, toward the ultimate target position XT to be achieved will be described.

In this figure, the carriage M4001 moves to the ultimate target position XT according to the dotted line arrow, and at the time when the carriage M4001 passes by the ultimate target position XT, the speed control amount Vc (t) is converted into a negative value. Thereafter, when the carriage M4001 reaches the minimum acceptable ultimate position (XT−n/2), the speed control amount Vc (t) is set 0, and consequently the driving of the motor is stopped.

Furthermore, in the case where the carriage M4001 moves in the + to − direction, the sign of the motor control amount M is opposite to the sign where the carriage moves in the − to + direction.

Then, the speed control processing performed by the speed control processing unit 3 will be described with reference to FIG. 14.

Figure 14:
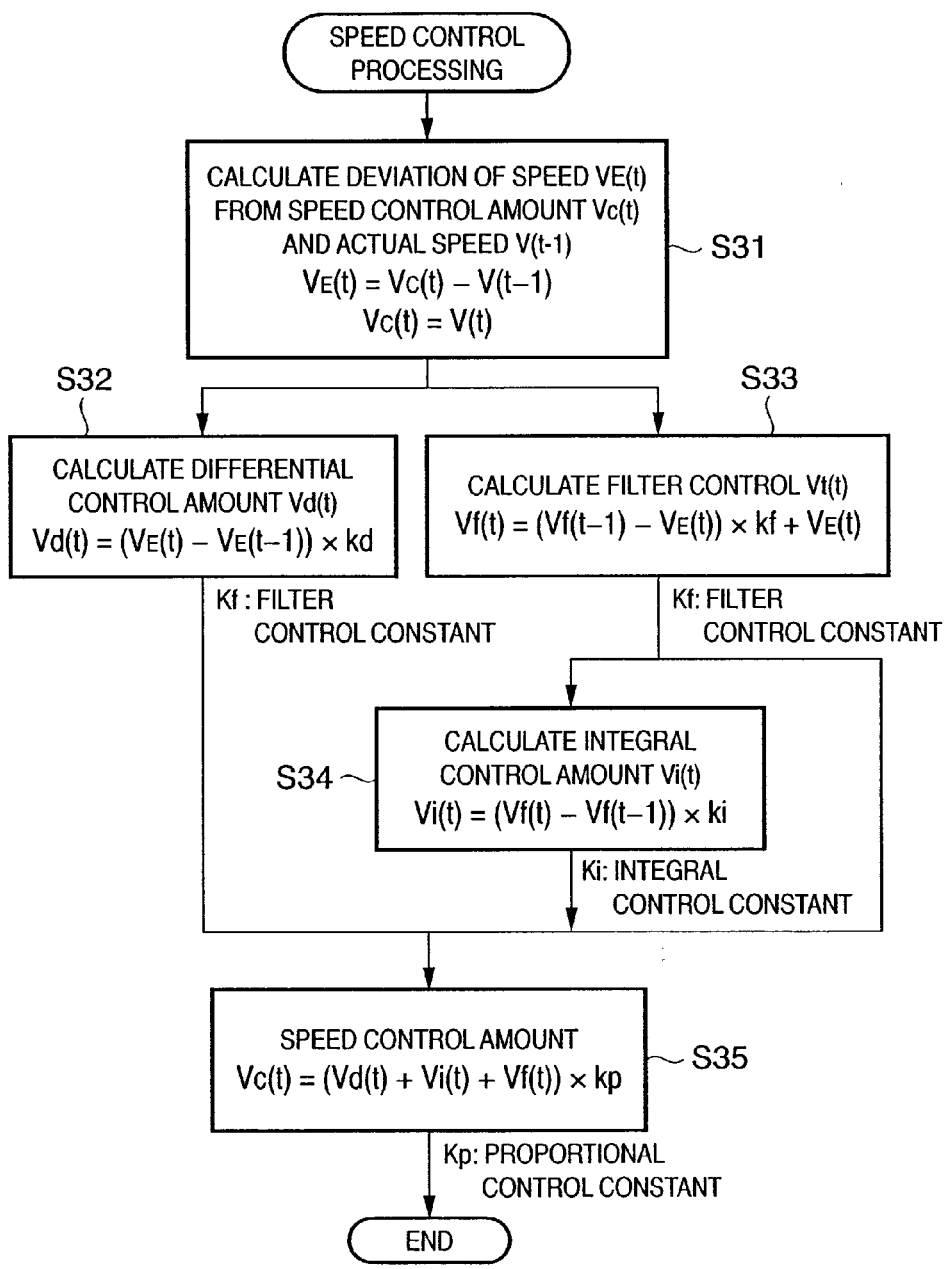
FIG. 14 is a flow chart showing speed control processing of First Embodiment of the present invention.

FIG. 14 is a flow chart showing the speed control processing of First Embodiment of the present invention.

Furthermore, this speed control processing is to control the speed of the carriage M4001 being scanned, and is used when the carriage M4001 is in the acceleration state, constant-speed state and deceleration state. The speed control processing is well known PID (Proportional, Integral, and Differential) control processing, in which processing is performed based on the deviation between the command speed and the actual speed.

First, the input in this speed control processing is the speed control amount Vc (t). In the case of First Embodiment, the results from the position control processing unit 2 are not used in the acceleration and constant-speed states. Therefore, this speed control amount Vc (t) equals the command speed V (t) calculated in the command value calculation processing 1.

First, at step S31, the command speed V (t) calculated by the command value calculation processing unit 1 is considered as the speed control amount Vc (t), and the actual speed v (t−1) of the carriage M4001 is subtracted from the command speed V (t) to calculate a deviation of speed VE (t). Here, the actual speed v (t−1) of the carriage M4001 is a speed which the CR motor E0001 can gain when it is driven. Therefore, (t−1) representing the result of the previous control is added.

Then, based on the deviation of speed VE (t) calculated at the step S31, a differential control amount Vd (t), a filter control amount Vf (t), and an integral control amount Vi (t) are calculated at steps S32 to S34, respectively.

The differential control amount Vd (t) to be calculated at the step S32 is calculated by determining a difference between the deviation of speed VE (t) calculated at the step S31 and the deviation of speed VE (t−1) calculated in the previous speed control processing, and multiplying the difference by a predefined differential control constant Kd. That is, the differential control amount Vd (t) is a value dependent on the change with time in the deviation of speed VE (t).

For the filter control amount Vf (t) to be calculated in the filter processing at the step S33, the deviation of speed VE (t) calculated at step S31 is subtracted from the filter control amount Vf (t−1) calculated at the immediately previous time of processing, and the value resulting from the subtraction is multiplied by the filter control constant Kf. Further, the deviation of speed VE (t) is added to the value resulting from this multiplication to calculate the filter control amount Vf (t).

Furthermore, in the filter processing at this time, a frequency component reflected on the deviation of speed VE (t) can be changed according to the predefined value of filter control constant Kf. In the case of First Embodiment, for example, the speed control processing unit 3 is set so that processing is performed at time intervals of 1 ms, and therefore if the filter processing is not performed, a change within 1 KHz is reflected on the deviation of speed VE (t) to be calculated at step S31. If the filter processing is performed, a frequency that is reflected can be set to 1 KHz or smaller depending on the value of filter control constant Kf.

The integral control amount Vi (t) to be calculated at step S34 is calculated by adding the filter control amount Vf (t) calculated at step S33 to the filter control amount Vf (t−1) calculated at the immediately previous time of processing, and multiplying the resulting value by an integral control constant Ki. That is, the integral control amount Vi (t) is a value dependent on the value obtained by adding the filter control amount Vf (t) at each time of processing.

Then, at step S35, the differential control amount Vd (t), the integral control amount Vi (t), and the filter control amount Vf (t) all calculated in this way are added together, and the value resulting from the addition is multiplied by a proportional control constant Kp to calculate the speed control amount Vc (t) that is the result of processing by the speed control processing unit 3.

Furthermore, the speed control amount Vc (t) calculated by the position control processing unit 2 and the speed control processing unit 3 is not a value suitable for the carriage motor driver E1004 for driving the CR motor E0001. Therefore, this speed control value Vc (t) is converted into a motor control amount M suitable for the motor driver E1004 by the motor control processing unit 4, and the speed control amount Vc (t) is input to the motor driver E1004, and as a result, the carriage M4001 is driven and scanned.

In this way, the speed control amount Vc (t) is calculated by the position control processing unit 2 and the speed control processing unit 3, and is converted into the motor control amount M in the motor control processing unit 4. Then, the carriage M4001 is controlled so as to be scanned in accordance with the command order of the CPU (E1001).

Next, the carriage drive control of First Embodiment for the carriage M4001 that is feedback-controlled will be described with reference to FIG. 15.

Figure 15:
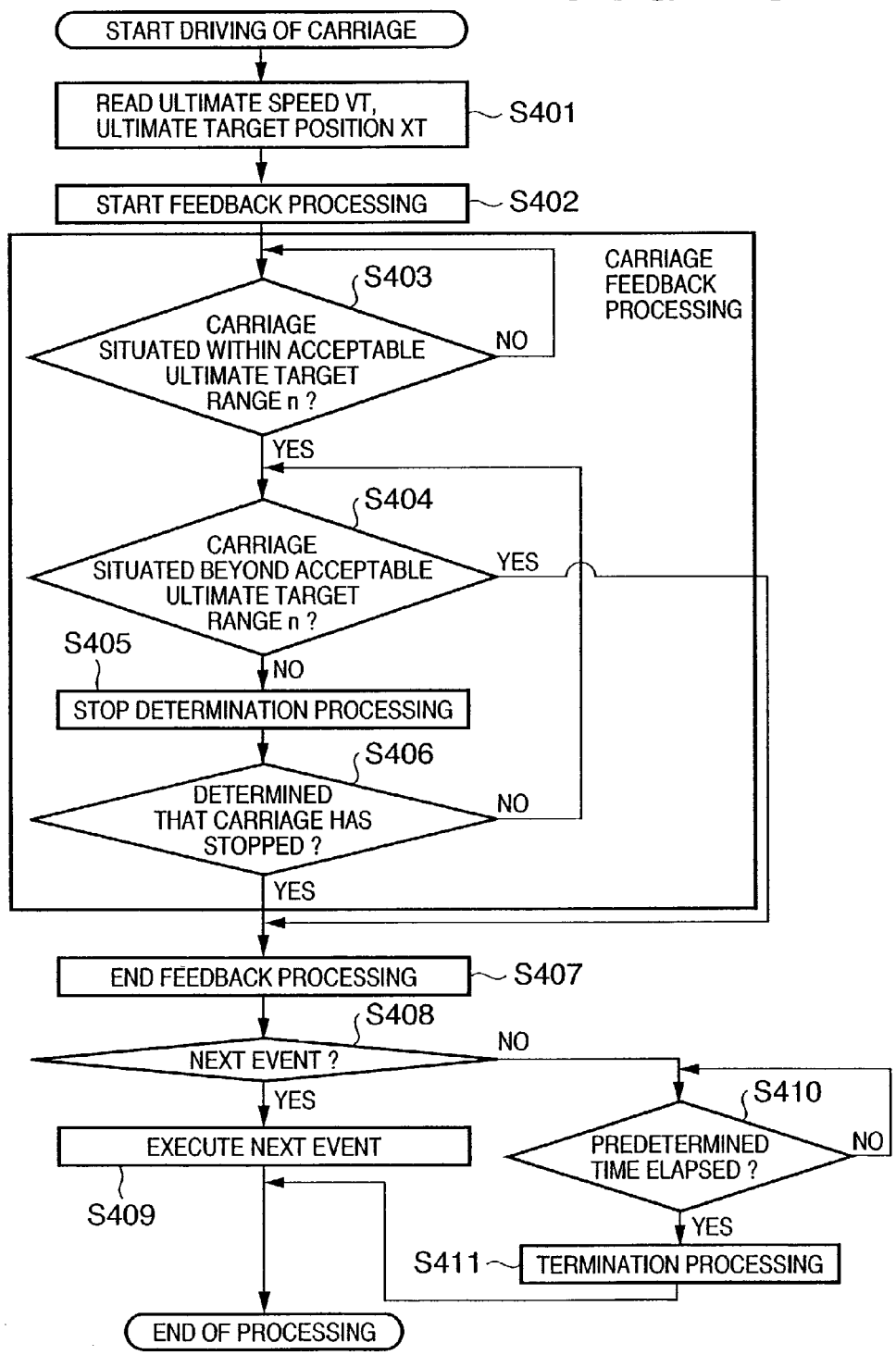
FIG. 15 is a flow chart showing the control of carriage drive of First Embodiment of the present invention.

FIG. 15 is a flow chart showing the carriage drive control of First Embodiment of the present invention.

The command order for recording operation is issued from the CPU (E1001) through the parallel I/F (E0016) and the serial I/F (E0017), and predetermined initial processing, feeding of the recording sheet P and the like are performed, followed by issuing a command order for driving the carriage M4001. When the command order for driving the carriage M4001 is issued, the command order is first received through the parallel I/F (E0016) and the serial I/F (E0017) and analyzed, and the ultimate speed VT and the ultimate target position XT for the carriage M4001 is read together with desired recording information at step S401. A drive mode of the carriage M4001 is determined from the ultimate speed VT and the above acceleration and deceleration α.

Then, at step S402, the feedback processing is started for driving and scanning the carriage M4001. With the feedback processing, the carriage M4001 starts accelerating, and is controlled so as to reach a predetermined ultimate speed VT designated at step S401, and is driven toward the ultimate target position XT.

When the driving of the carriage M4001 is started, then at step S403, the CPU (E1001) monitors an encoder signal from the encoder sensor E0004 at each time of feedback processing to determine whether the carriage M4001 has reached a position within the acceptable ultimate target range n (XT−n/2 to XT+n/2). Here, in the case of First Embodiment, the length of the acceptable ultimate target range n is 0.68 mm, extending from the position 0.34 mm before the ultimate target position XT in the scanning direction of the carriage M4001 to the position 0.34 mm after the ultimate target position XT in the scanning direction of the carriage (i.e. position within the range of from XT−0.34 to XT+0.34).

At step S403, if the carriage M4001 has not reached a position within the acceptable ultimate target range n (NO in step S403), monitoring is continued until the carriage M4001 reaches the position. On the other hand, if the carriage M4001 has reached a position within the acceptable ultimate target range n (YES in step S403), the processing moves to step S404, where whether the carriage M4001 is situated beyond the ultimate target position range n is determined.

If the carriage M4001 is situated beyond the ultimate target position range n (YES in step S404), the motor control amount M is stopped by the position control processing described with reference to FIG. 12, and thereafter the processing moves to step S407. On the other hand, if the carriage M4001 is not situated beyond the ultimate target position range n (NO in step S404), the processing moves to step S405 where stop determination processing is performed. Then, at step S406, whether the carriage M4001 has stopped or not is determined according to a predetermined stop determination condition. Here, the predetermined condition is such that it is determined that the carriage M4001 has stopped when it is recognized that the carriage M4001 has been situated within the acceptable ultimate target range n for 10 ms, for example. As a result of the determination, the processing returns to step S404 at step S406 if the stop determination condition is not satisfied (NO in step S406). On the other hand, if the stop determination condition is satisfied (YES in step S406), the processing moves to step S407, where the feedback processing is ended assuming that the scanning for the carriage M4001 is completed.

Then, at step S408, whether a next command order, namely a next event is directed or not is determined. Here, the next event refers to the operation of transporting the recording sheet P by the driving of the LF motor E0002 subsequent to the scanning for the carriage M4001, and the operation of driving the recovery unit M5000 to recover the recording head H1001 when the recording operation is performed.

At step S408, if the next event is directed (YES in step S408), the processing moves to step S409 where the next event is executed to end a series of processing associated with the carriage M4001. On the other hand, if the next event is not directed (NO in step S408), the processing moves to step S410 where the next event is waited until predetermined time elapses.

At step S410, if the next event is not directed even when the predetermined time elapses (YES in step S410), the processing moves to step S411, where the carriage M4001 is driven to a position opposite to the cap M5001 of the recovery unit M5000, followed by performing a capping operation and the like and carrying out termination processing to end a series of operations.

Figure 16:
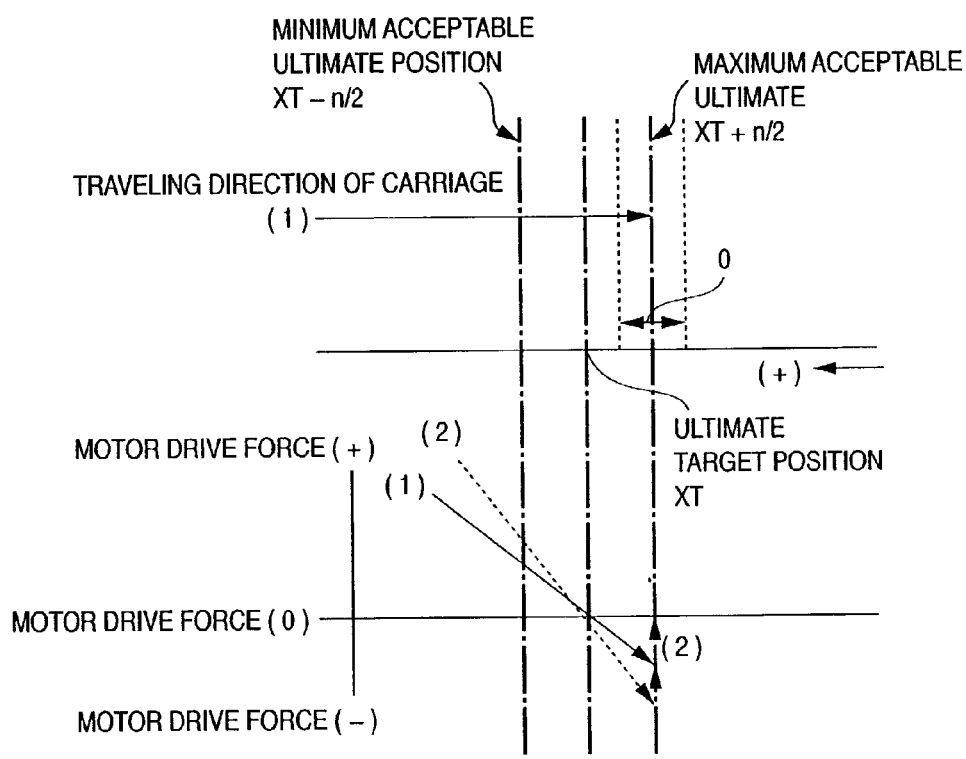
FIG. 16 illustrates the control state at the time when the carriage stops in the control of carriage drive of First Embodiment of the present invention.

Next, the motor control amount M for driving the carriage M4001 in the above carriage drive control is shown in FIG. 16.

FIG. 16 shows the situation in which the carriage M4001 is scanned with its speed sufficiently reduced in the direction toward the ultimate target position XT ((1) in the figure) and the situation in which the carriage M4001 is scanned with its speed reduced from a speed faster than that of the former situation ((2) in the figure).

First, in the situation in which the carriage M4001 is scanned with its speed sufficiently reduced ((1) in the figure), the motor control amount M reaches 0 at the time when the carriages passes by the ultimate target position XT, and thereafter the motor control amount M generates a motor control amount M in the direction opposite to the scanning direction of the carriage M4001. Even if the motor control amount M in the opposite direction is generated, a mechanical time delay occurs in association with a spring (not shown) supporting electrically the idler pulley M4006 and the carriage belt M4008 in the transfer system extending from the motor control processing unit 4 through the CR motor driver E1008 to the CR motor E0001, and from the CR motor E0001 to the carriage M4001, and therefore the carriage M4001 cannot be scanned in the opposite direction immediately. Thus, the carriage M4001 moves for a while without being given a certain scanning direction.

Furthermore, there are cases where the carriage M4001 moves beyond the acceptable maximum ultimate position XT+n/2 (in the case of First Embodiment, n=0.68 mm), and in these cases, the motor control amount immediately reaches 0 to stop generation of a motor drive. When the generation of a motor drive force is stopped, the speed of the carriage M4001 is sufficiently decreased and hence the inertial force is reduced, and therefore the opposite motor drive force generated by the motor is transferred to the carriage M4001 to move the carriage M4001 in the opposite direction slightly.

Then, in the situation in which the carriage M4001 is scanned with its speed reduced from a speed faster than that of the former situation ((2) in the figure), the carriage M4001 passes by the acceptable maximum ultimate position XT+n/2, and stops after moving slightly beyond the acceptable maximum ultimate position XT+n/2 even if the generation of the motor drive force is stopped. In this case, although the carriage M4001 stops after moving after the acceptable maximum ultimate position XT+n/2, and the carriage M4001 stops with no oscillation phenomenon occurring even in this situation. Here, the carriage M4001 stops at a position within a predetermined range D in the figure depending on the weight of the carriage M4001, the load on the motor, the control constant and the like.

As described above, according to First Embodiment, the carriage M4001 is drive-controlled in the way described above, thereby making it possible to have the carriage M4001 stopped at a position within the acceptable ultimate target range in the stop operation of the carriage M4001. Even if the carriage M4001 moves beyond the acceptable ultimate target range n, the carriage M4001 can be stopped without causing an oscillation phenomenon.

Second Embodiment

The acceptable ultimate target range n for the carriage M4001 is provided in a fixed manner in the description of First Embodiment, but in Second Embodiment, the acceptable ultimate target range n is provided in a variable manner depending on the ultimate target position XT for the carriage M4001.

In the case of the recording apparatus, there are a large number of ultimate target positions for the carriage M4001 in terms of its configuration and function. For example, there exist a camping position at which the recording element substrate of the recording head H1001 mounted on the carriage M4001 and the cap M5001 of the recovery unit M5000 are situated opposite to each other to carry out camping and suction the ink, a wiping position opposite to the wiper blade M5002 of the recovery unit M5000 to carry out the wiping operation, a preliminary discharge position of a preliminary discharge slot M3003b for carrying out preliminary discharge from the recording head H1001, and so on.

The carriage drive control of Second Embodiment for the carriage M4001 in this case will be described with reference to FIG. 17.

Figure 17:
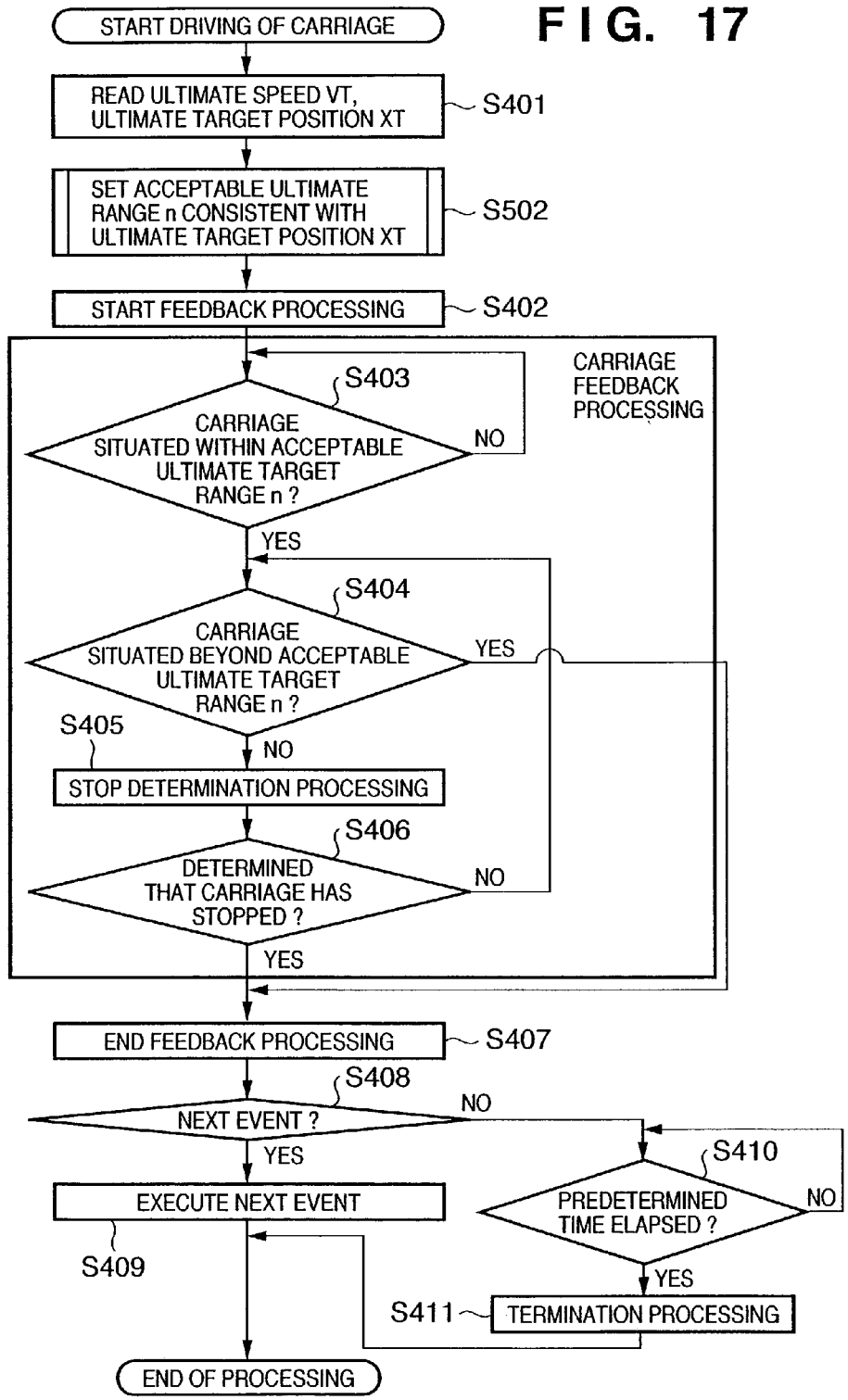
FIG. 17 is a flow chart showing the control of carriage drive of Second Embodiment of the present invention.

FIG. 17 is a flow chart showing the carriage drive control of Second Embodiment of the present invention.

Furthermore, the flow chart of FIG. 17 is similar to the flow chart of FIG. 15 of First Embodiment except that processing of step S502 is added, and for the common steps, the same step numbers are given and the descriptions thereof are not presented.

In FIG. 17, when a command order for driving the carriage M4001 is issued, the command order is received through the parallel I/F (E0016) and the serial I/F (E0017) and analyzed, and the ultimate speed VT and the ultimate target position XT for the carriage M4001 are read together with desired recording information at step S401. Then at step S502, the acceptable ultimate target range n is selected according to this ultimate target position XT and set.

Next, details of the processing of this step S502 will be described with reference to FIG. 18.

Figure 18:
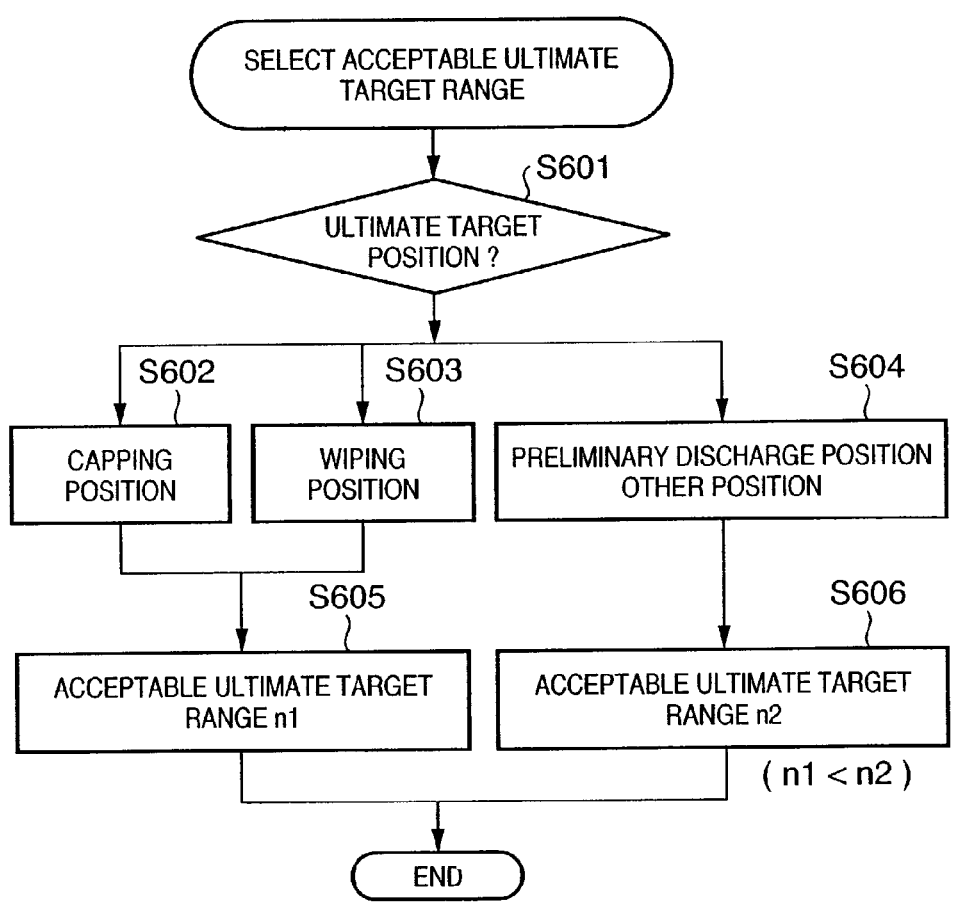
FIG. 18 is a flow chart showing in detail the processing in step S502 of Second Embodiment of the present invention.

FIG. 18 is a flow chart showing details of the processing of step S502 of Second Embodiment of the present invention.

When the ultimate speed VT and the ultimate target position XT are read, whether the ultimate target position XT is the camping position, the wiping position, the preliminary discharge position or other position is first determined at step S601. If it is found that the ultimate target position XT is the camping or wiping position as a result of the determination, the processing moves to step S605 by way of step S602 or step S603 where an acceptable ultimate target range n1 is set. Here, the n1 is, for example, 0.68 mm as described in First Embodiment.

On the other hand, if the ultimate target position XT is a preliminary discharge position or other position, the processing moves to step S606 by way of step S604 where an acceptable ultimate target range n2 is set. Here, the n2 is 1.35 mm, which is twice as large as the n1.

Furthermore, in the camping position and the wiping position, high stop accuracy is required for having situated opposite to each other the cap M5001, wiper blade M5002 and the like shown in FIG. 2 and the recording head H1001 mounted on the carriage M4001 to satisfactorily perform the suction operation and the wiping operation. Therefore, a value of 0.68 mm is set for the n1. On the other hand, in the preliminary and discharge position and other position, the operations are satisfactorily performed even with lower stop accuracy compared to the n1, a value larger than the n1 is set for the acceptable ultimate target range.

Here, for the ultimate target positions including the camping position, the wiping position and the preliminary discharge position, a predetermined range D is provided allowing for some cases where the carriage moves slightly beyond the acceptable ultimate target as described with reference to FIG. 16. The respective functions can satisfactorily be executed even if the carriage M4001 stops at any position within the predetermined range D.

As described above, according to Second Embodiment, the acceptable ultimate target range is set in a variable manner according to the ultimate target position XT, thereby making it possible to have the carriage M4001 stopped at a position within the acceptable ultimate target range with stability, in addition to the effect described in First Embodiment.

Third Embodiment

The acceptable ultimate target range is set according to the ultimate target position of the carriage M4001 in Second Embodiment, but in Third Embodiment, in addition thereto, drive modes for the scanning of the carriage M4001 (e.g. deceleration and scanning speed) are also set. Here for the deceleration of the scanning of the carriage, decelerations corresponding to a plurality of drive modes, constituted by different decelerations in advance, are provided in forms such as a table.

The setting of the deceleration is performed together with the setting of the acceptable ultimate target range in the processing of the step S502 of FIG. 17 of Second Embodiment. That is, at step S401, when a command order for driving the carriage M4001 is issued, the command order is received through the parallel I/F (E0016) and the serial I/F (E0017) and analyzed, and the ultimate speed VT and the ultimate target position XT for the carriage M4001 are read together with desired recording information. Then at step S502, an acceptable ultimate target range n consistent with the ultimate target position XT is selected and set, and the drive mode (deceleration) is selected and set.

Furthermore, a configuration in which the deceleration of the carriage M4001 is selected according to the drive mode is described as an example in Third Embodiment, but a configuration in which the scanning speed (traveling speed) of the carriage M4001 is selected is also acceptable.

Details of the processing of step S502 at this time will be described with reference to FIG. 19.

Figure 19:
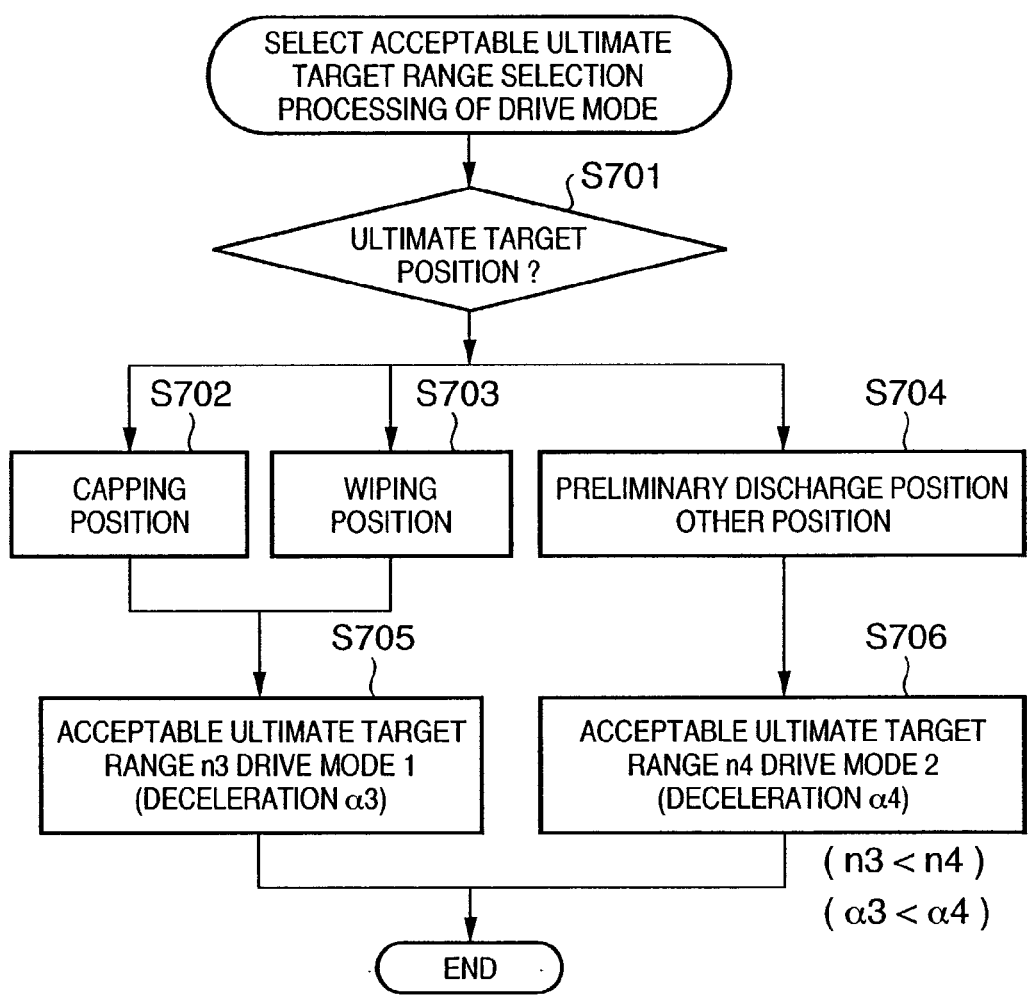
FIG. 19 is a flow chart showing in detail the processing in step S502 of Third Embodiment of the present invention.
Figure 20:
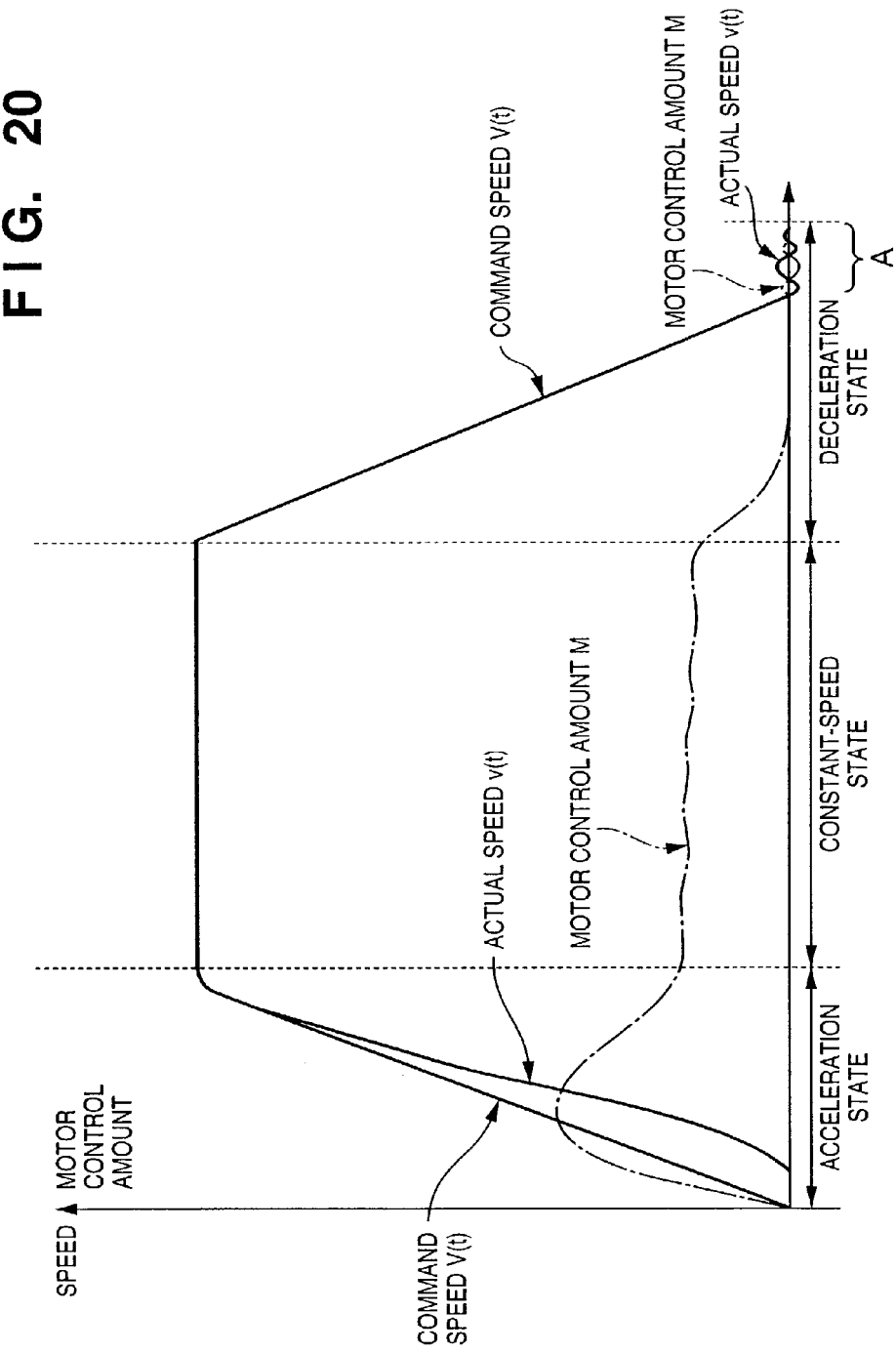
FIG. 20 illustrates the controlled condition when the carriage is controlled by a conventional control method.
Figure 22:
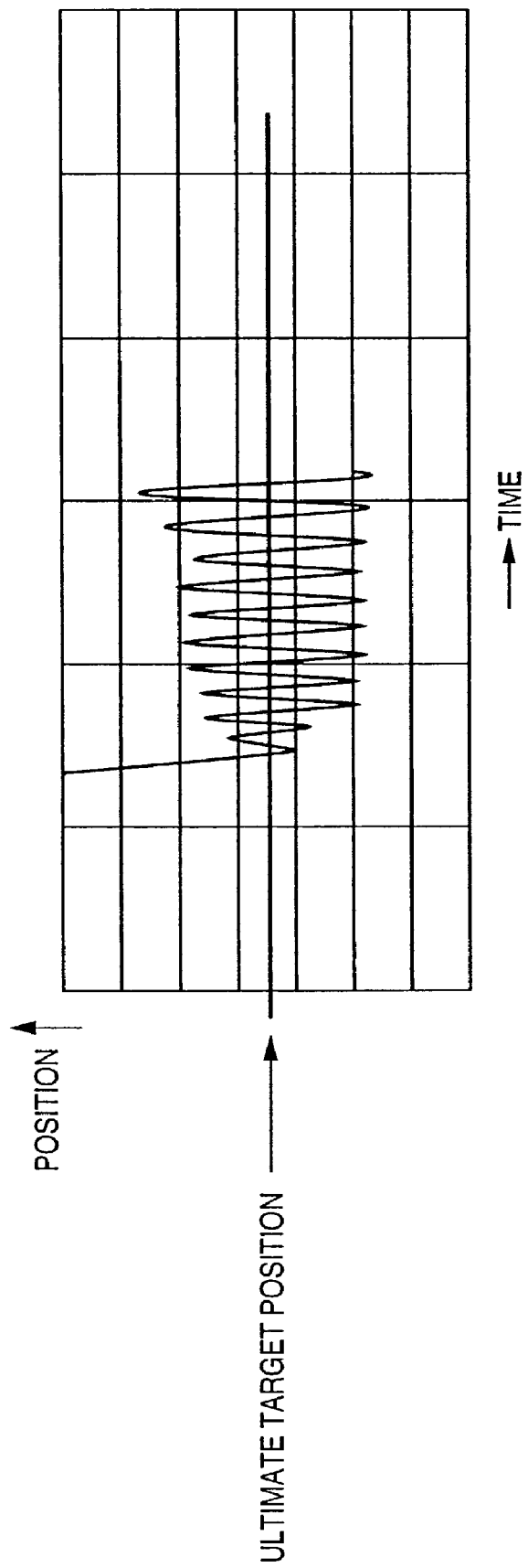
FIG. 22 illustrates the controlled condition at the time of stopping of the carriage in particular when the carriage is controlled by the conventional control method.

FIG. 19 is a flow chart showing details of the processing of step S502 of Third Embodiment of the present invention.

When the ultimate speed VT and the ultimate target position XT are read, whether the ultimate target position XT is the camping position, wiping position, the preliminary discharge position or other position is first determined at step S701. If it is found that the ultimate target position XT is the camping or wiping position as a result of the determination, the processing moves to step S705 by way of step S702 or step S703 where an acceptable ultimate target range n3 is set, and a drive mode 1 (deceleration $\alpha 3$ for the scanning of the carriage M4001). Here, the n3 is, for example, 0.38 mm.

On the other hand, if the ultimate target position XT is a preliminary discharge position or other position, the processing moves to step S706 by way of step S704 where an acceptable ultimate target range n4 is set, and a drive mode 2 (deceleration $\alpha 4$ for the scanning of the carriage M4001) is set. Here, the n4 represents 1.0 mm, which is much larger than n3, and a value larger than the deceleration $\alpha 3$ is set for the deceleration $\alpha 4$.

As described above, according to Third Embodiment, the acceptable ultimate target range and the drive mode (deceleration) for the scanning of the carriage (deceleration) are set in a variable manner according to the ultimate target position XT, thereby making it possible to perform a more appropriate and stable stop operation of the carriage in addition to the effect described in First and Second Embodiments. Here, in the case where deceleration is small, the inertia force of the carriage M4001 is reduced compared to the case where the deceleration is large, and therefore a narrower ultimate target position can be set.

Furthermore, in the above First to Third Embodiments, an example in which the invention is applied to the drive control of the carriage of the serial ink jet recording apparatus has been described, but the invention is limited thereto, and can be applied to the mechanism for transporting a print medium such as a recording sheet in the line recording apparatus, and to the control of a motor and a controlled object connected to the motor.

Whether the controlled object has stopped is determined based on the ultimate target position, but whether the controlled object has stopped may be determined based on the ultimate position rotational quantum number or rotational angle. In addition, the present invention has been described using a DC motor as an example, but the invention may be applied to other motors including, for example, an AC motor and a stepping motor instead of the DC motor.

Embodiments have been described above, but the present invention may be applied to a system consisting of a plurality of devices, or may be applied to an apparatus consisting of one device.

Furthermore, the present invention may also be achieved by supplying programs of software for achieving the functions of the aforesaid embodiments (programs corresponding to respective flow charts described above in the embodiments) directly or remotely to the system or apparatus, and having the supplied program codes read and executed by the computer of the system or apparatus. In this case, any forms other than programs may be adopted as long as they have functions of programs.

Accordingly, for achieving the functional processing of the present invention, the program code itself that is installed in the computer also contributes to achievement of the present invention. That is, the claims of the present invention also include the computer program itself for achieving the functional processing of the present invention.

In this case, any program forms may be used including an object code, a program executed by an interpreter and script data supplied to the OS as long as they have functions of programs.

Recording media for supplying programs include, for example, a floppy disk, a hard disk, an optical disk, a photomagnetic disk, an MO, a CD-ROM, a CD-R, a CD-RW, a magnetic tape, a nonvolatile memory card, a ROM and a DVD (DVD-ROM, DVD-R).

In addition, the program can be supplied by making a connection with a homepage on the Internet using a browser of a client computer, and downloading the computer program itself of the present invention, or a compressed file having an automatic installation function to a recording medium such as a hard disk. Also, the program can be supplied by dividing the program code constituting the program of the present invention into a plurality of files, and downloading respective files from different homepages. The WWW server allowing a plurality of users to download program files for achieving the functional processing of the present invention by the computer is also included in the claims of the present invention.

The program can also be supplied by encrypting the program of the present invention and storing the program in a recording medium such as a CD-ROM and distributing the same to users, and allowing users satisfying a predetermined condition to download key information for decrypting the encryption from a homepage through Internet, and executing the encrypted program to install the program in the computer by using the key information.

The computer executes a read program, whereby the aforesaid functions of the embodiments are achieved, and in addition thereto, the OS or the like operating on the computer performs part or all of actual processing based on the instruction of the program, by which the aforesaid functions of the embodiments may be achieved.

In addition, after the program read from the recording medium is written in a memory provided in a feature expansion board inserted in the computer or a feature expansion unit connected to the computer, the CPU or the like provided in the feature expansion board or the feature expansion unit performs part or all of the actual processing based on the instruction of the program, by which the aforesaid features of the embodiments are achieved.

As many apparently widely different embodiments of the present invention can be made without departing from the spirit and scope thereof, it is to be understood that the invention is not limited to the specific embodiments thereof except as defined in the appended claims.

What is claimed is:

1. A control apparatus for performing control to move a controlled object to a target position, comprising:
   an encoder for detecting a position of the controlled object and a speed of the controlled object;
   a DC motor for driving the controlled object in accordance with a speed control amount; and
   control means having first control means for performing a first feedback control of the speed control amount in an acceleration state and in a constant-speed state on the basis of a speed deviation between a command speed and an actual speed detected by using the encoder, and having second control means for performing a second feedback control of the speed control amount in a deceleration state on the basis of a position deviation between a command position and an actual position detected by the encoder, and on the basis of the target position and a target range, which is set according to the target position and includes positions ahead and behind the target position and has a predetermined length;
   control start means for setting the target position and the target range corresponding to the target position and for starting a feedback control of the control means;
   monitoring means for monitoring whether or not the controlled object reaches the target range;
   determination means for determining whether or not the controlled object is within the target range for a predetermined period, after the controlled object reaches the target range;
   control end means for ending the feedback control of the control means when the controlled object is within the target range for the predetermined period;
   wherein the second control means performs a first stop operation for stopping the controlled object when it is detected by the encoder that the controlled object is at or beyond the target position, by controlling to set the speed control amount to 0 if the controlled object is detected by the encoder at the target position, and by controlling to set the speed control amount so that the controlled object is immediately reverse-driven if the controlled object is detected by the encoder at a position beyond the target position, and
   performs a second stop operation for stopping the controlled object by immediately setting the speed control amount to 0 if the controlled object is detected by the encoder at a position beyond the target range.

2. The apparatus according to claim 1, wherein a drive mode of the controlled object is set according to the target position.

3. The apparatus according to claim 2, wherein the drive mode is deceleration speed.

4. A control method for performing control to move a controlled object to a target position, comprising:
   a detection step of an encoder detecting a position of the controlled object and a speed of the controlled object;
   a driving step of a DC motor driving the controlled object in accordance with a speed control amount; and
   a control step including a first control step of performing a first feedback control of the speed control amount in an acceleration state and in a constant-speed state on the basis of a speed deviation between a command speed and an actual speed detected by using the encoder, and including a second control step of performing a second feedback control of the speed control amount in a deceleration state on the basis of a position deviation between a command position and an actual position detected by the encoder, and on the basis of the target position and a target range, which is set according to the target position and includes positions ahead and behind the target position and has a predetermined length;
   a control start step of setting the target position and the target range corresponding to the target position and of starting a feedback control of the control step;
   a monitoring step of monitoring whether or not the controlled object reaches the target range;
   a determination step of determining whether or not the controlled object is within the target range for a predetermined period after the controlled object reaches the target range;
   a control end step of ending the feedback control of the control step when the controlled object is within the target range for the predetermined period;
   wherein the second control step performs a first stop operation for stopping the controlled object when it is detected by the encoder in the detection step that the controlled object is at or beyond the target position, by controlling to set the speed control amount to 0 if the controlled object is detected at the target position, and by controlling to set the speed control amount so that the controlled object is immediately reverse-driven if the controlled object is detected beyond the target position, and
   performs a second stop operation for stopping the controlled object by immediately setting the speed control amount to 0 if the controlled object is detected beyond the target range.

5. The method according to claim 4, wherein a drive mode of the controlled object is set according to the target position.

6. The method according to claim 5, wherein the drive mode is deceleration speed.

7. A recording apparatus for performing control to move a carriage for mounting a recording head to a target position, comprising:
   an encoder for detecting a position of the carriage and a speed of the carriage;
   a DC motor for driving the carriage in accordance with a speed control amount; and
   control means having first control means for performing a first feedback control of the speed control amount in an acceleration state or a constant-speed state on the basis of a speed deviation between a command speed and an actual speed detected by using the encoder, and having second control means for performing a second feedback control of the speed control amount in a deceleration state on the basis of a position deviation between a command position and an actual position detected by the encoder, and on the basis of the target position and a target range, which is set according to the target position and includes positions ahead and behind the target position and has a predetermined length;
   control start means for setting the target position and the target range corresponding to the target position and for starting a feedback control of the control means;
   monitoring means for monitoring whether or not the controlled object reaches the target range;
   determination means for determining whether or not the controlled object is within the target range for a predetermined period after the controlled object reaches the target range;
   control end means for ending the feedback control of the control means when the controlled object is within the target range for the predetermined period;

wherein the second control means performs a first stop operation for stopping the carriage when it is detected by the encoder that the carriage is at or beyond the target position, by controlling to set the speed control amount to 0 if the carriage is detected by the encoder at the target position, and by controlling to set the speed control amount so that the carriage is immediately reverse-driven if the carriage is detected by the encoder beyond the target position, and performs a second stop operation for stopping the carriage by immediately setting the speed control amount to 0 if the carriage is detected by the encoder beyond the target range.

8. The apparatus according to claim 7, wherein a drive mode of the carriage is set according to the target position.

9. The apparatus according to claim 8, wherein the drive mode is deceleration speed.

10. The apparatus according to claim 7, wherein the target position is any one of a capping position for suctioning ink from the recording head, a wiping position for wiping a surface of the recording head, and a preliminary discharge position for preliminary discharge of ink from the recording head.

11. The apparatus according to claim 10, wherein each of the target ranges corresponding to the capping position and the wiping position is smaller than the target range corresponding to the preliminary discharge position.

12. The apparatus according to claim 10, wherein the control means controls to set a deceleration speed for moving the carriage to the capping position or the wiping position smaller than a deceleration speed for moving the carriage to the preliminary discharge position.

13. A control method of a recording apparatus for performing control to move a carriage for mounting a recording head to a target position, comprising:

a detection step of an encoder detecting a position of the carriage and a speed of the carriage;

a driving step of a DC motor driving the carriage in accordance with a speed control amount; and a control step including a first control step of performing a first feedback control of the speed control amount in an acceleration state and in a constant-speed state on the basis of a speed deviation between a command speed and an actual speed detected by using the encoder, and a second control step of performing a second feedback control of the speed control amount in a deceleration state on the basis of a position deviation between a command position and an actual position detected by the encoder, and on the basis of the target position and a target range, which is set according to the target position and includes positions ahead and behind the target position and has a predetermined length;

a control start step of setting the target position and the target range corresponding to the target position and of starting a feedback control of the control means;

a monitoring step of monitoring whether or not the controlled object reaches the target range;

a determination step of determining whether or not the controlled object is within the target range for a predetermined period after the controlled object reaches the target range;

a control end step of ending the feedback control of the control step when the controlled object is within the target range for the predetermined period;

wherein the second control step performs a first stop operation for stopping the carriage when it is detected in the detection step that the carriage is at or beyond the target position, by controlling to set the speed control amount to 0 if the carriage is detected at the target position, and by controlling to set the speed control amount so that the carriage is immediately reverse-driven if the carriage is detected beyond the target position, and performs a second stop operation for stopping the carriage by immediately setting the speed control amount to 0 if the carriage is detected beyond the target range.

* * * * *